United States Patent
Kagawa et al.

(10) Patent No.: US 8,781,707 B2
(45) Date of Patent: Jul. 15, 2014

(54) VEHICLE CONTROL DEVICE, VEHICLE CONTROL METHOD, AND VEHICLE CONTROL SYSTEM

(71) Applicant: Toyota Jidosha Kabushiki Kaisha, Toyota (JP)

(72) Inventors: Kazunori Kagawa, Nagoya (JP); Masayoshi Hoshino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/026,873

(22) Filed: Sep. 13, 2013

(65) Prior Publication Data

US 2014/0012480 A1 Jan. 9, 2014

Related U.S. Application Data

(62) Division of application No. 13/387,284, filed as application No. PCT/JP2009/063426 on Jul. 28, 2009.

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ............... 701/96; 701/93; 701/117; 701/119; 340/903; 340/907; 340/934; 340/936

(58) Field of Classification Search
USPC ......... 701/1, 93, 96, 117, 118, 119, 408, 414, 701/423; 340/902, 903, 907, 934, 936, 988; 180/170
See application file for complete search history.

(56) References Cited

U.S. PATENT DOCUMENTS

| | | | |
|---|---|---|---|
| 5,781,119 A | 7/1998 | Yamashita et al. | |
| 6,289,278 B1 | 9/2001 | Endo et al. | |
| 7,206,686 B2 | 4/2007 | Sawamoto et al. | |
| 7,804,423 B2 | 9/2010 | Mudalige et al. | |
| 7,860,639 B2 | 12/2010 | Yang | |
| 8,185,300 B2 | 5/2012 | Miura et al. | |
| 8,428,858 B2 * | 4/2013 | Ishikawa et al. | 701/119 |

(Continued)

FOREIGN PATENT DOCUMENTS

| | | |
|---|---|---|
| JP | 8 314541 | 11/1996 |
| JP | 9 96359 | 4/1997 |

(Continued)

OTHER PUBLICATIONS

International Search Report Issued Sep. 1, 2009 in PCT/JP09/63426 Filed Jul. 28, 2009.

(Continued)

*Primary Examiner* — Rami Khatib
(74) *Attorney, Agent, or Firm* — Oblon, Spivak, McClelland, Maier & Neustadt, L.L.P.

(57) ABSTRACT

The amount of traffic on the road is greatly affected by both an inter-vehicle distance and a vehicle speed. When the amount of traffic increases and is more than a threshold value, an ECU 20 and an ACC 30 control the inter-vehicle distance and the vehicle speed such that the amount of traffic is a predetermined value equal to or more than the threshold value. In this way, it is possible to effectively suppress traffic congestion.

6 Claims, 25 Drawing Sheets

(56) References Cited

U.S. PATENT DOCUMENTS

| | | | |
|---|---|---|---|
| 8,452,771 B2 * | 5/2013 | Kurciska et al. | 707/737 |
| 2002/0059017 A1 | 5/2002 | Yamane et al. | |
| 2004/0078133 A1 | 4/2004 | Miller et al. | |
| 2006/0155427 A1 | 7/2006 | Yang | |
| 2007/0027610 A1 | 2/2007 | Parikh et al. | |
| 2007/0083318 A1 | 4/2007 | Parikh | |
| 2009/0245247 A1 | 10/2009 | Nakamura et al. | |
| 2012/0072089 A1 * | 3/2012 | Nemoto et al. | 701/96 |
| 2012/0123660 A1 | 5/2012 | Kagawa et al. | |
| 2012/0166059 A1 | 6/2012 | Aso | |
| 2012/0239253 A1 | 9/2012 | Schmidt et al. | |
| 2013/0080041 A1 * | 3/2013 | Kumabe | 701/117 |
| 2013/0138320 A1 | 5/2013 | Aso | |

FOREIGN PATENT DOCUMENTS

| | | |
|---|---|---|
| JP | 11-250396 | 9/1999 |
| JP | 2002 137652 | 5/2002 |
| JP | 2002 298281 | 10/2002 |
| JP | 2006 185136 | 7/2006 |
| JP | 2006-309736 | 11/2006 |
| JP | 2008 90587 | 4/2008 |
| JP | 2008-94167 | 4/2008 |
| JP | 2009 87062 | 4/2009 |
| JP | 2011-70462 | 4/2011 |

OTHER PUBLICATIONS

International Preliminary Report on Patentability and Written Opinion issued Feb. 16, 2012 in PCT/JP2009/063426.

Office Action issued Feb. 10, 2014 in U.S. Appl. No. 13/386,794, filed Jan. 24, 2012.

* cited by examiner

VEHICLE CONTROL DEVICE, VEHICLE CONTROL METHOD, AND VEHICLE CONTROL SYSTEM

CROSS-REFERENCE TO RELATED APPLICATIONS

This application is a division of U.S. application Ser. No. 13/387,284, filed Jan. 26, 2012, of which the entire contents are incorporated herein by reference. This application also claims priority to Japanese Patent Application No. PCT/JP2009/063426, filed Jul. 28, 2009.

TECHNICAL FIELD

The present invention relates to a vehicle control device, a vehicle control method, and a vehicle control system and more particularly, to a vehicle control device, a vehicle control method, and a vehicle control system capable of improving the amount of traffic on the road.

BACKGROUND ART

In recent years, there is an attempt to control the traveling of each vehicle, thereby improving the amount of traffic on the road and reducing traffic congestion. For example, Patent Literature 1 discloses a vehicle-in-front following device which detects a change in the gradient of the front side of the road and changes the control mode from inter-vehicle distance control to vehicle speed control when a change in the gradient is detected in front of the road in the vicinity of, for example, a sag section (position where the road is changed from a descent to an ascent). In the vehicle-in-front following device disclosed in Patent Literature 1, the control mode is changed from inter-vehicle distance control to vehicle speed control in the vicinity of the sag section, thereby suppressing a change in the vehicle speed during vehicle-in-front following control. In particular, the vehicle-in-front following device disclosed in Patent Literature 1 prevents a phenomenon in which a change in the speed of the vehicle in front is amplified and propagated to the following vehicle even though the gradient is changed in the sag section when a plurality of vehicles travel in a line.

CITATION LIST

Patent Literature

[Patent Literature 1] Japanese Unexamined Patent Application Publication No. 2002-137652

SUMMARY OF INVENTION

Technical Problem

However, in the above-mentioned technique, even when the control mode is changed to vehicle speed control in the vicinity of the sag section, deceleration propagation in which the deceleration of the vehicle in front is propagated to the following vehicle is not prevented. When the vehicles travel in a line, the deceleration of the vehicle increases toward the rear side. In the above-mentioned technique, when the control mode is changed to vehicle speed control in front of the sag section, but the deceleration propagation occurs, there is a concern that the control mode will return to inter-vehicle distance control in order to prevent the inter-vehicle distance from being too short. Therefore, in the above-mentioned technique, the control mode is changed from vehicle speed control to inter-vehicle distance control at the time when the deceleration propagation occurs, resulting in traffic congestion in which a plurality of vehicles travel in a line at a low speed. As a result, it is difficult to effectively suppress traffic congestion.

The invention has been made in view of the above-mentioned problems and an object of the invention is to provide a vehicle control device, a vehicle control method, and a vehicle control system capable of effectively suppressing traffic congestion.

Solution to Problem

According to an aspect of the invention, there is a provided a vehicle control device including: information acquiring means for acquiring information related to the amount of traffic on a road on which a host vehicle travels; and traveling control means for, when the amount of traffic related to the information acquired by the information acquiring means is more than a first threshold value, controlling an inter-vehicle distance between the host vehicle and other vehicles traveling on the road and the speed of the host vehicle such that the amount of traffic is equal to or more than a second threshold value.

The amount of traffic on the road is greatly affected by the inter-vehicle distance and the vehicle speed. According to the above-mentioned structure, when the amount of traffic increases and is more than the first threshold value, the traveling control means controls the inter-vehicle distance and the vehicle speed such that the amount of traffic is a predetermined value equal to or more than a second threshold value. Therefore, it is possible to effectively suppress traffic congestion.

The traveling control means may change the inter-vehicle distance and the vehicle speed at which the amount of traffic is equal to or more than the second threshold value, depending on the number of other vehicles which can communicate with the host vehicle.

According to this structure, the traveling control means changes the inter-vehicle distance and the vehicle speed at which the amount of traffic is equal to or more than the second threshold value, depending on the number of vehicles which can communicate with the host vehicle and have high flexibility in the control of the inter-vehicle distance and the vehicle speed by the host vehicle. Therefore, it is possible to suppress traffic congestion according to the actual situation.

The information acquiring means may acquire information related to the number of other vehicles which cannot communicate with the host vehicle between the host vehicle and other vehicles which can communicate with the host vehicle, and the traveling control means may change the inter-vehicle distance at which the amount of traffic is equal to or more than the second threshold value, depending on the number of other vehicles which cannot communicate with the host vehicle between the host vehicle and other vehicles which can communicate with the host vehicle related to the information acquired by the information acquiring means.

According to this structure, the traveling control means changes the inter-vehicle distance at which the amount of traffic is equal to or more than the second threshold value, depending on the number of vehicles which cannot communicate with the host vehicle and have low flexibility in the control of the inter-vehicle distance and the vehicle speed by the host vehicle. Therefore, it is possible to perform vehicle control considering the actual traffic conditions and traffic flow.

The traveling control means may change the first threshold value, depending on a region including the road.

According to this structure, the first threshold value for starting the control of the inter-vehicle distance and the vehicle speed is changed depending on the region including the road. Therefore, for example, when the road is in the region in which traffic congestion occurs frequently, such as a sag section, the first threshold value is changed depending on the region. In this way, it is possible to effectively suppress traffic congestion.

When the traveling control means changes the inter-vehicle distance and the vehicle speed at which the amount of traffic is equal to or more than the second threshold value depending on the number of other vehicles which can communicate with the host vehicle, the information acquiring means may acquire information related to the amount of traffic in each lane of the road, and the traveling control means may control at least one of the inter-vehicle distance and the vehicle speed on the basis of the amount of traffic in each lane of the road related to the information acquired by the information means.

The amount of traffic on the road is greatly affected by the concentration of the amount of traffic in each lane. According to this embodiment, the traveling control means controls at least one of the inter-vehicle distance and the vehicle speed on the basis of the amount of traffic in each lane of the road related to the information acquired by the information means. Therefore, it is possible to effectively suppress traffic congestion according to the concentration of the amount of traffic in each lane.

According to another aspect of the invention, there is provided a vehicle control method including: a step of acquiring information related to the amount of traffic on a road on which a host vehicle travels; and a step of, when the amount of traffic related to the acquired information is more than a first threshold value, controlling an inter-vehicle distance between the host vehicle and other vehicles traveling on the road and the speed of the host vehicle such that the amount of traffic is equal to or more than a second threshold value.

In the step of controlling the inter-vehicle distance and the vehicle speed such that the amount of traffic is equal to or more than the second threshold value, the inter-vehicle distance and the vehicle speed at which the amount of traffic is equal to or more than the second threshold value may be changed depending on the number of other vehicles which can communicate with the host vehicle.

In the step of acquiring the information related to the amount of traffic on the road on which the host vehicle travels, information related to the number of other vehicles which cannot communicate with the host vehicle between the host vehicle and other vehicles which can communicate with the host vehicle may be acquired. In the step of controlling the inter-vehicle distance and the vehicle speed such that the amount of traffic is equal to or more than the second threshold value, the inter-vehicle distance at which the amount of traffic is equal to or more than the second threshold value may be changed depending on the number of other vehicles which cannot communicate with the host vehicle between the host vehicle and other vehicles which can communicate with the host vehicle related to the acquired information.

In the step of controlling the inter-vehicle distance and the vehicle speed such that the amount of traffic is equal to or more than the second threshold value, the first threshold value may be changed depending on a region including the road.

In the step of acquiring the information related to the amount of traffic on the road on which the host vehicle travels, information related to the amount of traffic in each lane of the road may be acquired. In the step of controlling the inter-vehicle distance and the vehicle speed such that the amount of traffic is equal to or more than the second threshold value, at least one of the inter-vehicle distance and the vehicle speed may be controlled on the basis of the amount of traffic in each lane of the road related to the information acquired by the information means.

According to still another aspect of the invention, there is provided a vehicle control system including: information acquiring means for acquiring information related to the amount of traffic on a road on which a plurality of vehicles travel; and traveling control means for, when the amount of traffic related to the information acquired by the information acquiring means is more than a first threshold value, controlling an inter-vehicle distance between at least two of the vehicles traveling on the road and the speed of at least one of the vehicles such that the amount of traffic is equal to or more than a second threshold value.

The traveling control means may change the inter-vehicle distance and the vehicle speed at which the amount of traffic is equal to or more than the second threshold value, depending on the number of vehicles which can communicate with each other.

The information acquiring means may acquire information related to the number of vehicles which cannot communicate with each other between the vehicles which can communicate with each other, and the traveling control means may change the inter-vehicle distance at which the amount of traffic is equal to or more than the second threshold value, depending on the number of vehicles which cannot communicate with each other between the vehicles which can communicate with each other related to the information acquired by the information acquiring means.

The traveling control means may change the first threshold value, depending on a region including the road.

The information acquiring means may acquire information related to the amount of traffic in each lane of the road, and the traveling control means may control at least one of the inter-vehicle distance and the vehicle speed on the basis of the amount of traffic in each lane of the road related to the information acquired by the information means.

Advantageous Effects of Invention

According to the vehicle control device, the vehicle control method, and the vehicle control system of the invention, it is possible to effectively suppress traffic congestion.

DESCRIPTION OF EMBODIMENTS

Figure 1:
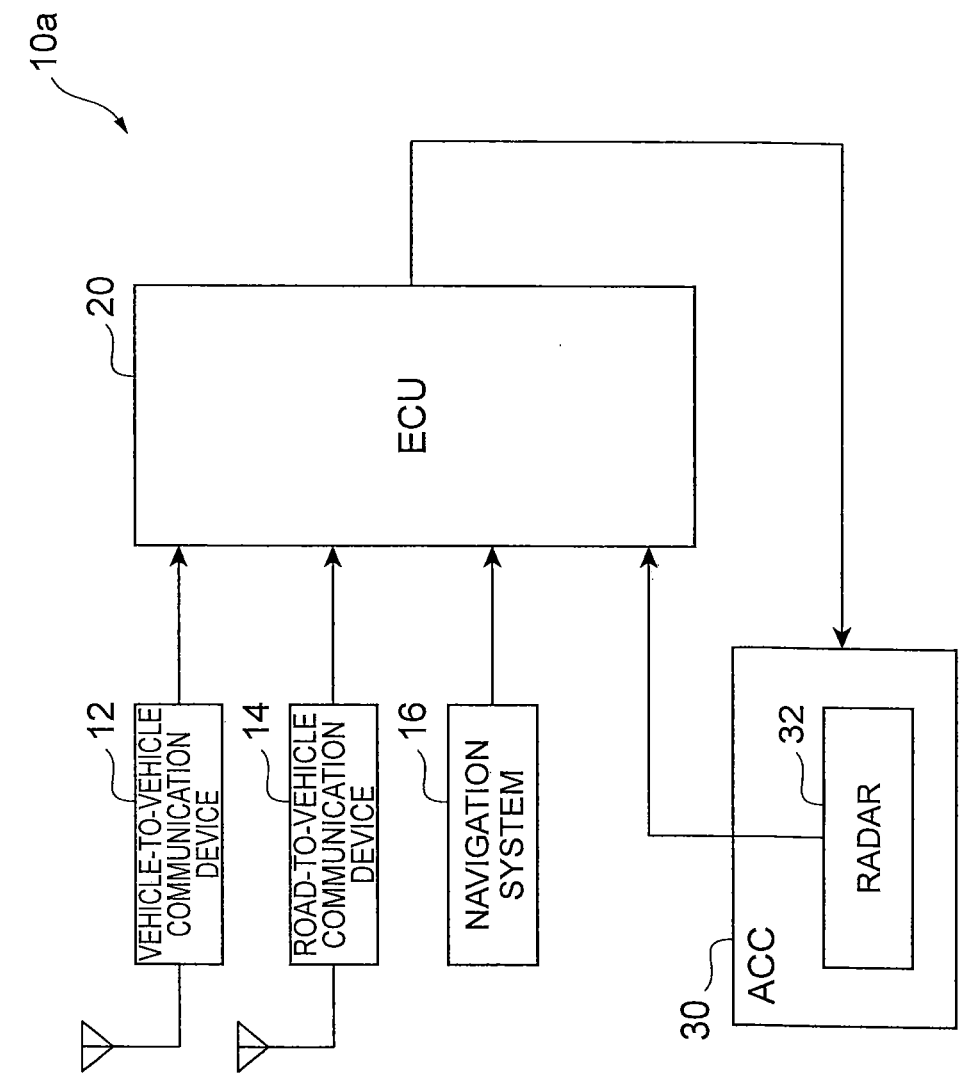
FIG. 1 is a block diagram illustrating the structure of a vehicle control device according to a first embodiment.

Hereinafter, a vehicle control device according to an embodiment of the invention will be described with reference to the accompanying drawings. The vehicle control device according to this embodiment is provided in a vehicle and performs vehicle control for improving the amount of traffic on the road. As shown in FIG. 1, a vehicle control device 10a according to this embodiment includes a vehicle-to-vehicle communication device 12, a road-to-vehicle communication device 14, a navigation system 16, an ECU (Electronic Control Unit) 20, and an ACC (Adaptive Cruise Control) 30.

The vehicle-to-vehicle communication device 12 performs vehicle-to-vehicle communication to transmit or receive information about the position or speed of system-provided vehicles other than a host vehicle, or information indicating whether to turn on or off vehicle control for preventing traffic congestion.

The road-to-vehicle communication device 14 receives information, such as the amount of traffic on the road or the speed of the vehicle traveling on the road, from a road infrastructure, such as an optical beacon communication device. In this embodiment, the road-to-vehicle communication device 14 is not necessarily essential.

The navigation system 16 includes a GPS (Global Positioning System) that receives signals from a plurality of GPS satellites using a GPS receiver and measures the position of the host vehicle from the difference between the signals and a map information DB (Database) that stores the map information of the host vehicle. The navigation system 16 guides the route of the host vehicle and acquires information related to the position where the speed of the vehicle in front of the host vehicle is reduced, such as a sag section. For example, the navigation system 16 detects the position of the host vehicle relative to the sag section and outputs the position to the ECU 20.

The ECU 20 receives information related to the position of the host vehicle relative to the sag section from the navigation system 16 and receives information related to the relative position and relative speed of other vehicles around the host vehicle from a radar 32 of the ACC 30. In addition, the ECU outputs traveling control command values, such as a target vehicle speed, acceleration and deceleration G, and a target inter-vehicle distance, to the ACC 30 on the basis of the information input from the navigation system 16 and the ACC 30.

The ACC 30 includes the radar 32 that detects the relative position and relative speed of other vehicles around the host vehicle. The ACC 30 performs traveling control on the basis of the traveling control command values from the ECU 20 such that the host vehicle has the target vehicle speed, the acceleration and deceleration G, and the target inter-vehicle distance.

Figure 2:
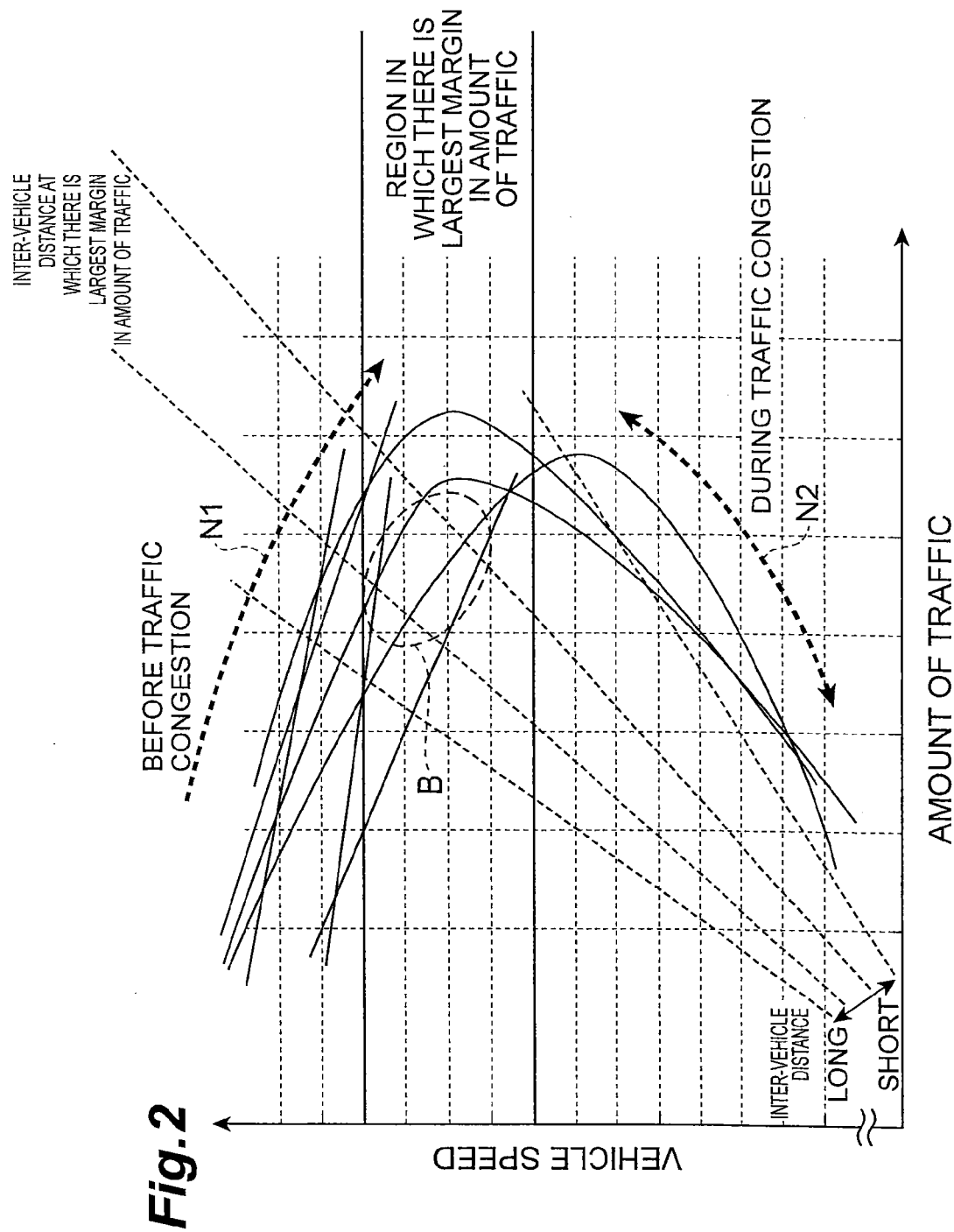
FIG. 2 is a graph illustrating the relationship among the amount of traffic, a vehicle speed, and an inter-vehicle distance before and after traffic congestion occurs.
Figure 3:
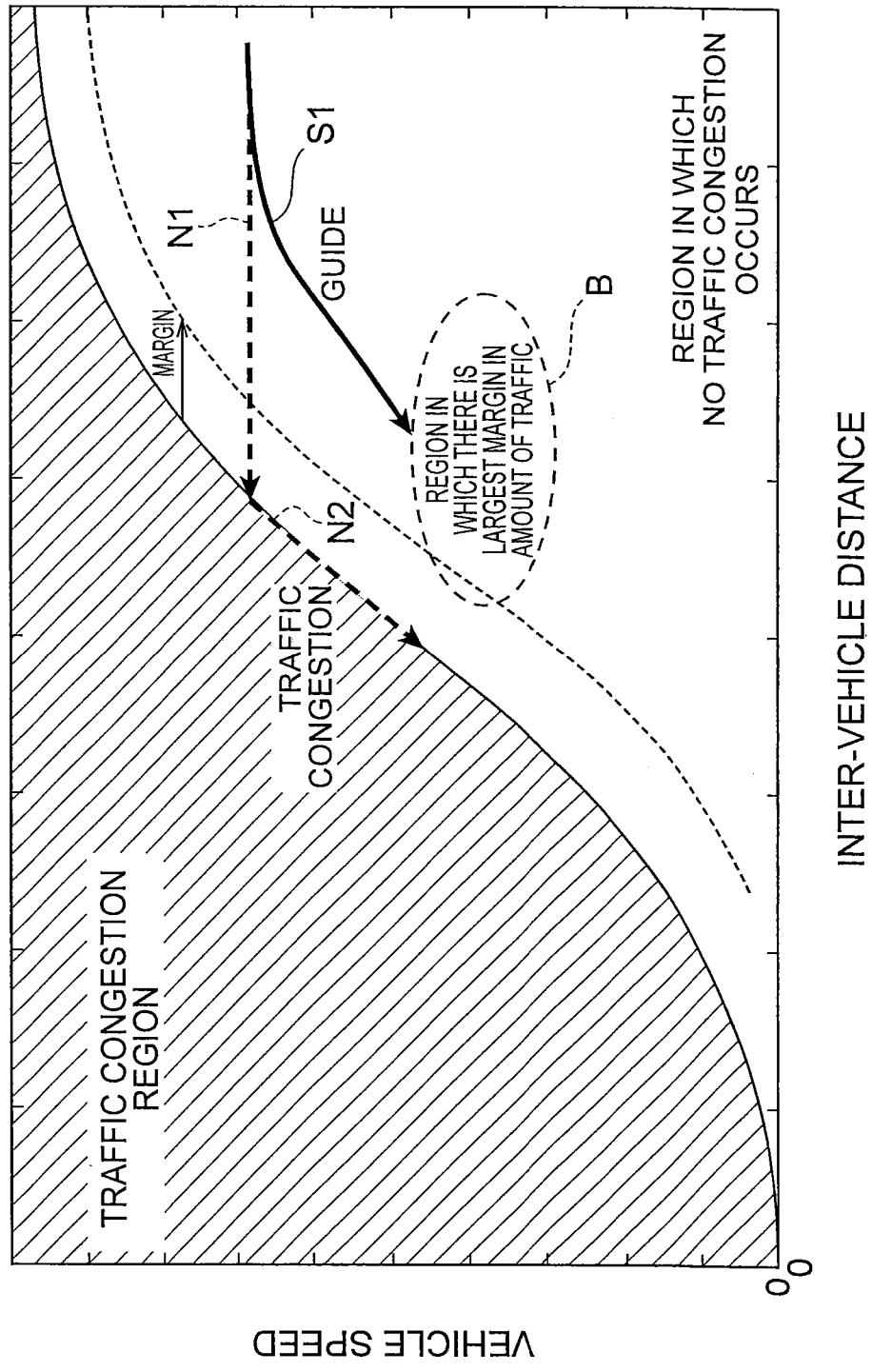
FIG. 3 is a graph illustrating a region in which traffic congestion occurs and a region in which no traffic congestion occurs in the relationship between the inter-vehicle distance and the vehicle speed.

Next, the operation of the vehicle control device 10a according to this embodiment will be described. First, as a premise, the principle of reducing traffic congestion in the vehicle control device 10a according to this embodiment will be described. As shown in FIGS. 2 and 3, in the relationship between the amount of traffic and a vehicle speed, a region B in which there is the largest margin in the amount of traffic is disposed at a vehicle speed of about 60 km/h and an inter-vehicle distance of about 40 m immediately before traffic congestion. However, in practice, it is difficult to drive the vehicle while maintaining the region B in which there is the largest margin in the amount of traffic. When the inter-vehicle distance is gradually reduced, deceleration propagation in which the deceleration of the leading vehicle is sequentially propagated to the following vehicles occurs, or deceleration is amplified by the deceleration propagation. As a result, it is difficult to recover the vehicle speed and traffic congestion occurs (N2).

The inter-vehicle distance becomes too short due to the following causes. That is, (1) The vehicle speed is gradually reduced (N1) and the driver of the vehicle presses on his or her way to reduce the inter-vehicle distance.

(2) At the position where the vehicle speed is locally reduced, such as a sag section, traffic congestion occurs and the amount of traffic increases partially.

As a method of preventing the traffic congestion, the following methods are considered in which a road-side infrastructure checks traffic conditions and predicts traffic congestion on the basis of information from sensors which are provided on the road, thereby preventing the traffic congestion.

(A) A method of reducing traffic inflow using a route distribution instruction (B) A method of restricting traffic inflow into a traffic congestion section by, for example, allowing the stopping and starting of the vehicle (C) A method of allowing the infrastructure side to instruct a change in, for example, vehicle speed and lane Alternatively, in order to prevent traffic congestion, the following method is considered in which the infrastructure side checks traffic conditions and predicts traffic congestion on the basis of information from a probe car.

(D) A method of controlling a probe car such that a traffic flow is controlled

However, since the methods (A) to (D) are performed on condition that the infrastructure is installed, they are not effective in the following traffic congestion.

(a) Traffic congestion which is likely to occur at any position, such as traffic congestion caused by a breakdown, a falling object, a broken-down car, and road construction (b) Traffic congestion at the position where no infrastructure is installed even though the occurrence of traffic congestion has been determined In particular, the method (A) is performed on condition that there are (a plurality of) detour routes and is not used at positions other than the central area of a metropolitan. In addition, it is doubted whether the driver follows a detour instruction for preventing traffic congestion, not a detour instruction for avoiding traffic congestion which has occurred. In addition, each driver is likely to feel unfair (for example, difference in transit time or traveling distance) according to whether a detour instruction is given to the vehicle, which is not practical.

The method (B) has no effect of preventing traffic congestion when traffic congestion occurs in an inflow restriction portion. In the method (C), even when a vehicle speed and a driving lane are instructed, traffic congestion occurs when the inter-vehicle distance is reduced. Therefore, the method (C) may have no effect according to the magnitude of the inter-vehicle distance. In addition, even when the driving lanes of a large number of vehicles are instructed, it is not expected that the vehicles will be moved in the way that is intended to prevent the concentration of the vehicles on the lanes. In addition, it is difficult to provide desired control information, such as the percentage and number of vehicles which are desired to change their lanes, to the drivers using a display on the road. The method (D) is suitable for a specific position and is a centralized method. Therefore, the method (D) is a large-scale method requiring standardization, which is not practical.

Therefore, in this embodiment, before traffic congestion occurs, the inter-vehicle distance and speed of the vehicles are guided to the region B in which there is the largest margin in the amount of traffic, as shown in FIGS. 2 and 3 (S1). That is, vehicle control is performed such that traffic congestion is less likely to occur. Specifically, in this embodiment, the vehicle control is performed by the following methods.

(1) When all the vehicles traveling on the road have a communication function and are provided with a vehicle speed control (for example, ACC/CC (Adaptive Cruise control/Cruise Control)) system, vehicle control is performed such that each vehicle has the above-mentioned inter-vehicle distance and vehicle speed. That is, the system-provided vehicle is controlled or guided to a vehicle speed and an inter-vehicle distance at which the amount of traffic is the maximum, according to the vehicle speed.

(2) When a general vehicle without including the system is mixed on the road, vehicle control is performed such that the system-provided vehicle predicts the number of general vehicles between the system-provided vehicles and the inter-vehicle distance is maintained using the sum of the inter-vehicle distances as an upper limit.

(3) When the inter-vehicle distance is controlled to be long after the vehicle enters a region in which the amount of traffic increases partially, such as a sag section, deceleration occurs, which results in traffic congestion. In order to prevent the problem, the system-provided vehicle predicts an inter-vehicle time (target inter-vehicle time) at the position (in the vicinity of the position where traffic congestion occurs) where the vehicle speed is the minimum before the sag section and starts vehicle speed and inter-vehicle distance control before the inter-vehicle time is equal or less than the predicted value. That is, the system-provided vehicle changes a control start position depending on the amount of traffic.

Figure 4:
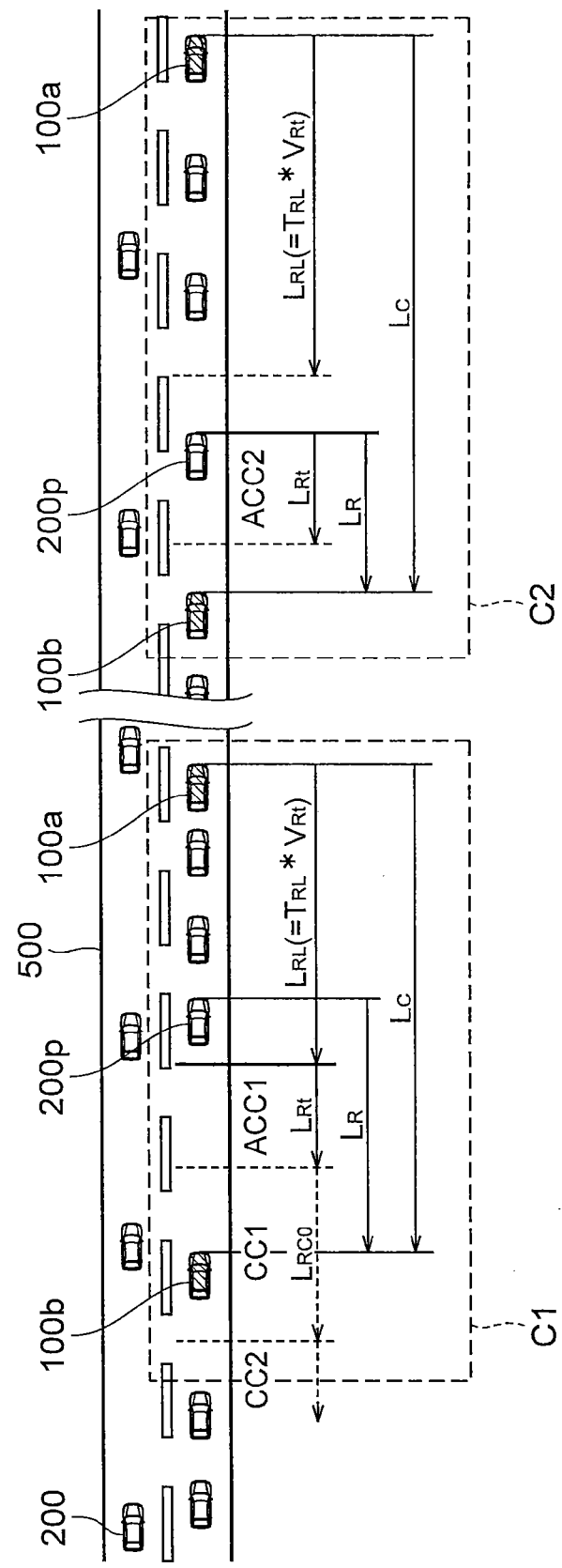
FIG. 4 is a plan view illustrating an example of a situation in which the vehicle control device according to the first embodiment is applied.

Next, the detailed operation of the vehicle control device $10a$ according to this embodiment will be described. As shown in FIG. 4, it is assumed that system-provided vehicles $100a$ and $100b$ provided with the vehicle control device $10a$ according to this embodiment and a general vehicle $200$ which is not provided with the vehicle control device $10a$ travel together on a road $500$. In each lane, the system-provided vehicle $100b$ follows one leading system-provided vehicle $100a$. Several general vehicles $200$ travel between the system-provided vehicle $100a$ and the system-provided vehicle $100b$. The vehicle control device $10a$ of the following system-provided vehicle $100b$ sets ACC1 and ACC2 sections in which the system-provided vehicle $100b$ travels while performing inter-vehicle control and CC1 and CC2 sections in which the system-provided vehicle $100b$ travels while performing cruise control, according to the distance relationship with the general vehicle $200p$ which travels immediately in front of the system-provided vehicle $100b$.

First, the operation of the second or subsequent system-provided vehicle $100b$ in each lane in a given section shown in FIG. 4 will be described (S11). The length of the given section is determined by the communicable distance between the system-provided vehicles $100a$ and $100b$. When the speed of the first system-provided vehicle $100a$ in each lane is $V_P$, the control start relative speed of the second or subsequent second system-provided vehicle $100b$ in each lane is $V_{th}$, the speed of the second or subsequent system-provided vehicle $100b$ in each lane is V, and the relative speed difference $V_P - V$ is less than the control start relative speed $V_{th}$ ($V_P - V \le V_{th}$) (S12), the vehicle control device $10a$ of the system-provided vehicle $100b$ performs traveling control for guiding the vehicle speed and the inter-vehicle distance (S13). For example, the time when the amount of traffic reaches 40 to 80 vehicles/minute in two lanes may be used as a traveling control start condition. Alternatively, the vehicle speed and the inter-vehicle distance at which the amount of traffic is obtained may be the traveling control start condition.

When the speed V of the system-provided vehicle $100b$ satisfies $V > V_{OR}$ or $V > V_{OL}$ (where $V_{OR}$ is the initial speed of the system-provided vehicle $100b$ when the system-provided vehicle $100b$ travels in a passing lane and traveling control starts and $V_{OR}$ is the initial speed of the system-provided vehicle $100b$ when the system-provided vehicle $100b$ travels in a driving lane and traveling control starts) (S14), the vehicle control device $10a$ of the system-provided vehicle $100b$ controls the speed V of the system-provided vehicle $100b$ such that the speed V and the initial speeds satisfy the relationship $V = V_{OR}$ or $V > V_{OL}$ (S15).

When the target speed of the system-provided vehicle $100b$ is $V_{Rt}$, the additional upper limit of the target speed of the system-provided vehicle $100b$ is $V_d$, the speed V of the system-provided vehicle 100b satisfies V≤$V_{Rt}$+$V_d$ (S16), the vehicle control device 10a of the system-provided vehicle 100b performs the subsequent steps. When the speed V of the system-provided vehicle 100b satisfies V>$V_{Rt}$+$V_d$ (S16), the vehicle control device 10a of the system-provided vehicle 100b performs Steps S13 to S16 again. The target vehicle speed $V_{Rt}$ is appropriately changed depending on, for example, the number of other system-provided vehicles 100a and 100b within the communicable distance, the number of general vehicles 200, and whether there are a sag section, a curved road, a tunnel, and gradient in the region including the road 500. For example, the target vehicle speed $V_{Rt}$ may be set in the range of 40 km/h to 80 km/h and preferably, in the range of 60 km/h to 75 km/h.

Next, the operation of guiding the vehicle speed and the inter-vehicle distance in Step S13 will be described in detail. As shown in a case C1 of FIGS. 6 and 4, when the distance headway (the distance between the heads of two vehicles) between the system-provided vehicle 100b and a general vehicle 200p which is immediately in front of the system-provided vehicle 100b is $L_R$, the speed of the general vehicle 200p is $V_{pre}$, the distance headway between the leading system-provided vehicle 100a and the system-provided vehicle 100b is $L_C$, a predicted distance headway between the leading system-provided vehicle 100a and the vehicle which is immediately in front of the system-provided vehicle 100b is $L_{RL}$, the predicted distance headway satisfies $L_C$-$L_R$<$L_{RL}$, and the general vehicle 200p which is immediately in front of the system-provided vehicle 100b is within the predicted distance headway $L_{RL}$ (S13a), the vehicle control device 10a of the system-provided vehicle 100b performs Step S13b.

The predicted distance headway $L_{RL}$ between the leading system-provided vehicle 100a and the general vehicle 200p which is immediately in front of the system-provided vehicle 100b is calculated by the product of a target time headway $T_{RL}$ between the leading system-provided vehicle 100a and the general vehicle 200p which is immediately in front of the system-provided vehicle 100b and the target speed $V_{Rt}$ of the leading system-provided vehicle 100a ($L_{RL}$=$T_{RL}$·$V_{Rt}$).

It is assumed that the estimated value of the number of general vehicles 200 between the leading system-provided vehicle 100a and the system-provided vehicle 100b is N. When a predicted time headway between the general vehicles 200 which travel in the passing lane is $T_{preR}$ and a predicted time headway between the general vehicles 200 which travel in the driving lane is $T_{preL}$, the estimated value N of the number of general vehicles 200 between the leading system-provided vehicle 100a and the system-provided vehicle 100b can be calculated as follows: N=($L_C$-$L_R$)/($T_{preR}$·$V_p$) or N=($L_C$-$L_R$)/($T_{preL}$·$V_p$). The predicted time headways $T_{preR}$ and $T_{preL}$ between the general vehicles 200 or the number of general vehicles 200 may be estimated by observing the distance from the vehicle which travels in an adjacent lane using the radar 32.

When a target guide time headway between the general vehicles 200 is $k_{TL}$ and the margin of the predicted time headway between the general vehicles 200 is $k_{RT0}$, the target time headway $T_{RL}$ between the leading system-provided vehicle 100a and the general vehicle 200p which is immediately in front of the system-provided vehicle 100b is calculated as follows: $T_{RL}$=func(N)=$k_{TL}$·N+$k_{RT0}$.

In addition, the target distance headway $L_{Rt}$ between the system-provided vehicle 100b and the general vehicle 200p which is immediately in front of the system-provided vehicle 100b is calculated by the product of the target speed $V_{Rt}$ of the system-provided vehicle 100b and a target time headway $T_{Rt}$ between the system-provided vehicle 100b and the vehicle which is immediately in front of the system-provided vehicle 100b ($L_{Rt}$=$V_{Rt}$·$T_R$).

When $L_{RL}$+$L_{Rt}$<$L_C$<$L_{RL}$+$L_{Rt}$+$L_{RC0}$ is not satisfied (S13b), that is, when the system-provided vehicle 100b is not in the CC1 section shown in FIG. 4 from the distance relationship with the general vehicle 200p which is immediately in front of the system-provided vehicle 100b, the vehicle control device 10a of the system-provided vehicle 100b performs steps after Step S13c.

When $L_C$≥$L_{RL}$+$L_{Rt}$+$L_{RC0}$ is not satisfied (S13c), that is, when the system-provided vehicle 100b is in the ACC1 section, not the CC2 section, in FIG. 4 in the distance relationship with the general vehicle 200p which is immediately in front of the system-provided vehicle 100b, the vehicle control device 10a of the system-provided vehicle 100b performs Step S13d. In this case, the vehicle control device 10a of the system-provided vehicle 100b sets a target acceleration calculation intermediate value $\alpha_{tc}$ such that $\alpha_{tc}$=$k_{\alpha L}$(($L_{RL}$+$L_{Rt}$)-$L_C$) is established (S13d) (where $k_{\alpha L}$ is an acceleration gain when ACC is performed). That is, the vehicle control device 10a controls the system-provided vehicle 100b so as to move from the ACC1 section to the CC1 section.

In Step S13d, when $L_{RL}$+$L_{Rt}$<$L_C$<$L_{RL}$+$L_{Rt}$+$L_{RC0}$ is satisfied, that is, when the system-provided vehicle 100b is in the CC1 section in FIG. 4, the vehicle control device 10a of the system-provided vehicle 100b sets the target acceleration calculation intermediate value $\alpha_{tc}$ such that $\alpha_{tc}$=$k_{\alpha V}$($V_p$-V) is established (where $k_{\alpha V}$ is an acceleration gain when CC is performed) (S13f). That is, the vehicle control device 10a controls the system-provided vehicle 100b so as to stay in the CC1 section.

In Step S13c, when $L_C$≥$L_{RL}$+$L_{Rt}$+$L_{RC0}$ is satisfied, that is, when the system-provided vehicle 100b is in the CC2 section in FIG. 4, the vehicle control device 10a of the system-provided vehicle 100b sets the target acceleration calculation intermediate value $\alpha_{tc}$ such that $\alpha_{tc}$=$k_{\alpha V}$(($V_p$+$V_d$)-V) is established (S13g). That is, the vehicle control device 10a controls the system-provided vehicle 100b such that the distance between the system-provided vehicle 100b and the general vehicle 200p which is immediately in front of the system-provided vehicle 100b is reduced and the system-provided vehicle 100b moves from the CC2 section to the CC1 section.

In Step S13a, as shown in a case C2 of FIG. 4, when $L_C$-$L_R$<$L_{RL}$ is not satisfied and the general vehicle 200p which is immediately in front of the system-provided vehicle 100b is not within the predicted distance headway $L_{RL}$ (S13a), the vehicle control device 10a of the system-provided vehicle 100b performs Step S13e.

Figure 7:
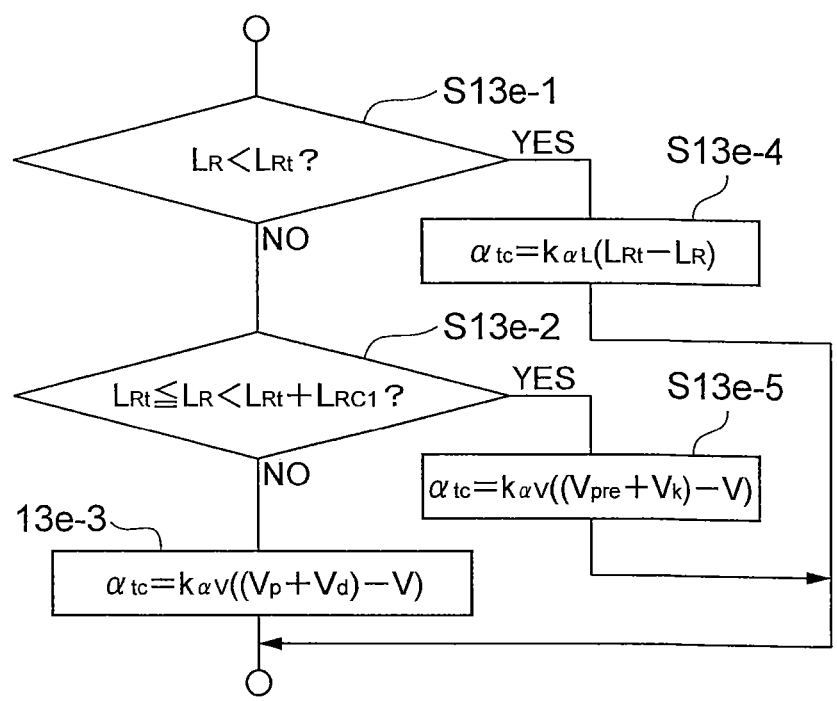
FIG. 7 is a flowchart illustrating the details of the operation of guiding the vehicle speed and the inter-vehicle distance.

As shown in detail in FIG. 7, in Step S13e, when $L_R$<$L_{Rt}$ is not satisfied (S13e-1) and $L_{Rt}$≤$L_R$<$L_{Rt}$+$L_{RC1}$ is not satisfied (where $L_{RC1}$ is the distance of the ACC2 section in which the relative vehicle speed is adjusted in the case C2) (S13e-2), that is, when the actual distance headway is more than the target distance headway and the system-provided vehicle 100b is out of the ACC2 section in which the relative vehicle speed is adjusted, the vehicle control device 10a of the system-provided vehicle 100b sets the target acceleration calculation intermediate value $\alpha_{tc}$ such that $\alpha_{tc}$=$k_{\alpha V}$(($V_p$+$V_d$)-V) is established (S13e-3). That is, the vehicle control device 10a controls the system-provided vehicle 100b so as to move to the ACC2 section in the case C2 of FIG. 4.

In Step S13g-1, when $L_R$<$L_{Rt}$ is satisfied (S13e-1), that is, when the actual distance headway is less than the target distance headway and the system-provided vehicle 100b is in the ACC2 section, the vehicle control device 10a of the system-provided vehicle 100b sets the target acceleration calculation intermediate value $\alpha_{tc}$ such that $\alpha_{tc}=k_{\alpha L}(L_{Rt}-L_R)$ is established (S13e-3). That is, the vehicle control device 10a controls the system-provided vehicle 100b so as to travel while maintaining the distance headway between the system-provided vehicle 100b and the general vehicle 200p which is immediately in front of the system-provided vehicle 100b to be the target inter-vehicle distance $L_{Rt}$.

In Step S13g-2, when $L_{Rt} \leq L_R < L_{Rt}+L_{RC1}$ is satisfied (S13e-2), that is, when the actual distance headway is more than the target distance headway and the system-provided vehicle 100b is in the ACC2 section in which the relative vehicle speed is adjusted, the vehicle control device 10a of the system-provided vehicle 100b sets the target acceleration calculation intermediate value $\alpha_{tc}$ such that $\alpha_{tc}=k_{\alpha V}((V_{pre}+V_k)-V)$ is established (where $V_k$ is a target value of the speed of the system-provided vehicle 100b relative to the speed $V_{pre}$ of the general vehicle 200p which is immediately in front of the system-provided vehicle 100b in the ACC section in which the relative vehicle speed is adjusted) (S13e-5). That is, the vehicle control device 10a controls the system-provided vehicle 100b such that the relative speed thereof to the general vehicle 200p which is immediately in front of the system-provided vehicle 100b is equal to the target value $V_k$ and the system-provided vehicle 100b moves to the ACC2 section in the case C2 of FIG. 4.

Returning to FIG. 6, when the maximum acceleration of the acceleration side is $\alpha_a$, the maximum acceleration of the deceleration side is $\alpha_d$, and $\alpha_{tc}>\alpha_a$ or $\alpha_{tc}<\alpha_d$ is satisfied (S13h), that is, when the target acceleration calculation intermediate value $\alpha_{tc}$ is more than the maximum acceleration $\alpha_a$ or $\alpha_d$ of the acceleration side or the deceleration side, the vehicle control device 10a of the system-provided vehicle 100b sets a target acceleration $\alpha_t$ of the system-provided vehicle to be equal to the maximum acceleration $\alpha_a$ or $\alpha_d$ ($\alpha_t=\alpha_a$ or $\alpha_t=\alpha_d$) (S13i). When $\alpha_{tc}>\alpha_a$ or $\alpha_{tc}<\alpha_d$ is not satisfied (S13h), that is, when the target acceleration calculation intermediate value $\alpha_{tc}$ is not more than the maximum acceleration $\alpha_a$ or $\alpha_d$ of the acceleration side or the deceleration side, the vehicle control device 10a of the system-provided vehicle 100b sets the target acceleration $\alpha_t$ of the system-provided vehicle to be equal to the target acceleration calculation intermediate value $\alpha_{tc}$ ($\alpha_t=\alpha_{tc}$) (S13j).

Figure 5:
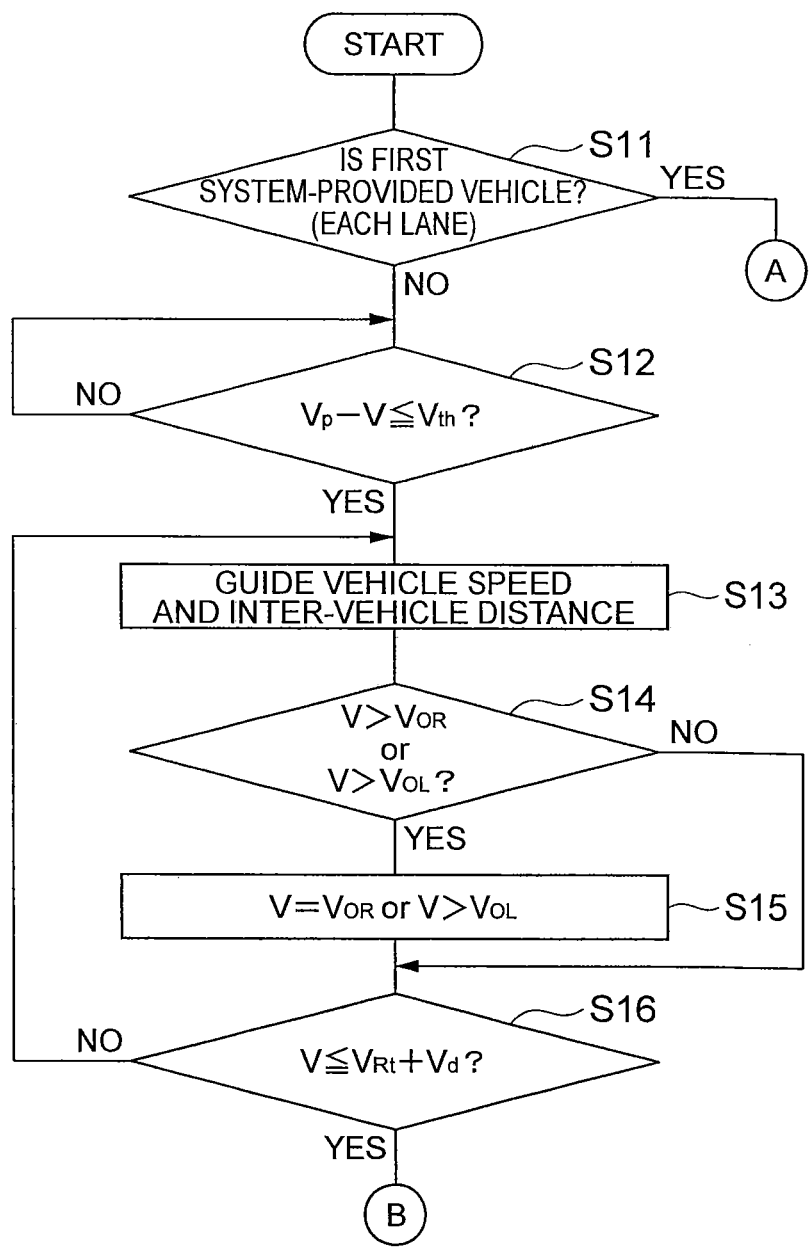
FIG. 5 is a flowchart illustrating an operation of guiding the vehicle speed and the inter-vehicle distance.
Figure 6:
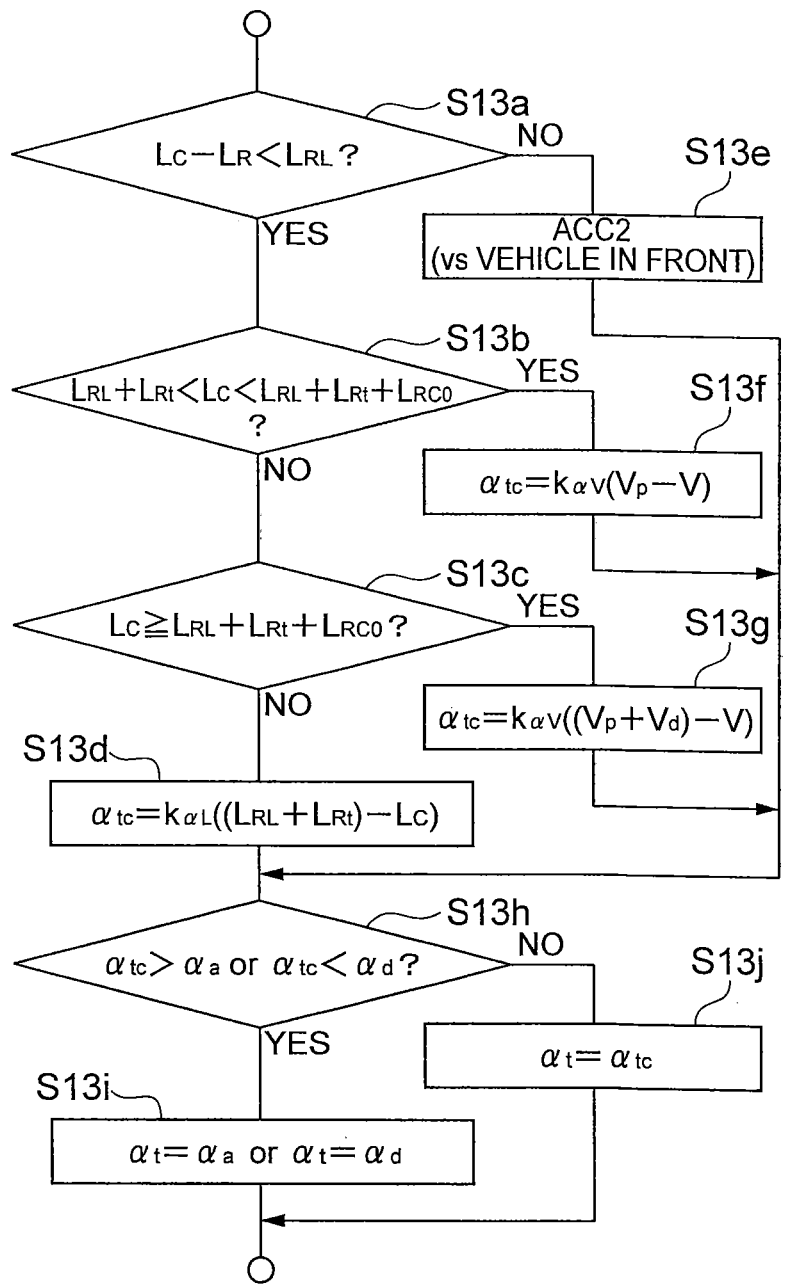
FIG. 6 is a flowchart illustrating the details of the operation of guiding the vehicle speed and the inter-vehicle distance.
Figure 8:
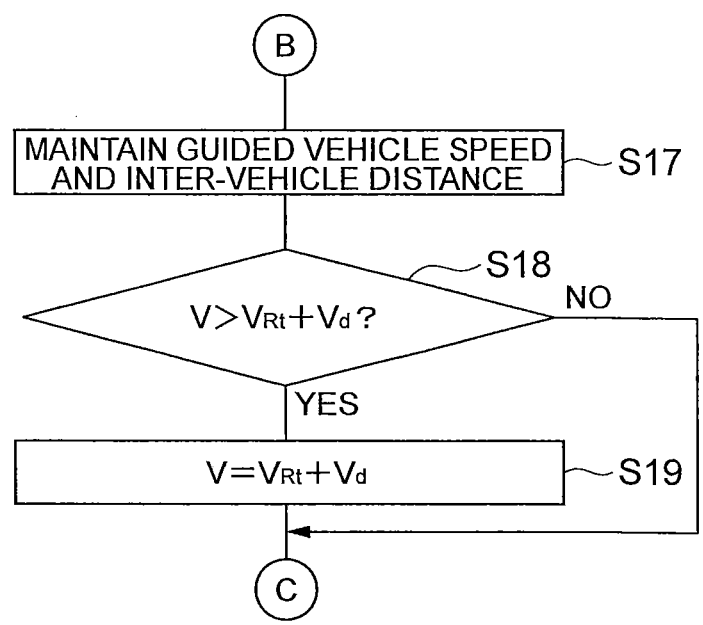
FIG. 8 is a flowchart illustrating an operation of maintaining the guided vehicle speed and inter-vehicle distance.

As described with reference to FIGS. 5 to 7, after the vehicle control device 10a of the system-provided vehicle 100b performs control for guiding the vehicle speed and the inter-vehicle distance, it performs control for maintaining the guided vehicle speed and inter-vehicle distance, as shown in FIG. 8 (S17). When $V>V_{Rt}+V_d$ is satisfied, that is, when the speed V of the system-provided vehicle 100b is more than the sum of the target vehicle speed $V_{Rt}$ and the target vehicle speed added upper limit $V_d$ (S18), the vehicle control device 10a of the system-provided vehicle 100b sets the speed V such that $V=V_{Rt}+V_d$ is established (S19). The system-provided vehicle 100b which has been decelerated to $V_{Rt}+V_d$ once is controlled to travel using the speed $V=V_{Rt}+V_d$ as the upper limit speed.

Next, the operation of maintaining the guided vehicle speed and inter-vehicle distance in Step S17 will be described in detail. As shown in the case C1 of FIGS. 9 and 4, when $L_C-L_R<L_{RL}$, is satisfied and the general vehicle 200p which is immediately in front of the system-provided vehicle 100b is within the predicted distance headway $L_{RL}$ (S17a), the vehicle control device 10a of the system-provided vehicle 100b performs Step S17b. When $L_{RL}+L_{Rt}<L_C<L_{RL}+L_{Rt}+L_{RC0}$ is not satisfied (S17b), that is, when the system-provided vehicle 100b is not in the CC1 section of FIG. 4 from the distance relationship with the general vehicle 200p which is immediately in front of the system-provided vehicle 100b, the vehicle control device 10a of the system-provided vehicle 100b performs Step S17c.

When $L_C \geq L_{RL}+L_{Rt}+L_{RC0}$ is not satisfied (S17c), that is, when the system-provided vehicle 100b is in the ACC1 section of FIG. 4, not the CC2 section, in the distance relationship with the general vehicle 200p which is immediately in front of the system-provided vehicle 100b, the vehicle control device 10a of the system-provided vehicle 100b performs Step S17d. In this case, the vehicle control device 10a of the system-provided vehicle 100b sets the target acceleration calculation intermediate value $\alpha_{tc}$ such that $\alpha_{tc}=k_{\alpha L}((L_{RL}+L_R)-L_C)$ is established (S17d). That is, the vehicle control device 10a controls the system-provided vehicle 100b so as to move from the ACC1 section to the CC1 section.

In Step S17b, when $L_{RL}+L_{Rt}<L_C<L_{RL}+L_{Rt}+L_{RC0}$ is satisfied, that is, when the system-provided vehicle 100b is in the CC1 section of FIG. 4, the vehicle control device 10a of the system-provided vehicle 100b sets the target acceleration calculation intermediate value $\alpha_{tc}$ such that $\alpha_{tc}=k_{\alpha v}(V_{Rt}-V)$ is established (S17f). That is, the vehicle control device 10a controls the system-provided vehicle 100b so as to stay in the CC1 section.

In Step S17c, when $L_C \geq L_{RL}+L_{Rt}+L_{RC0}$ is satisfied, that is, when the system-provided vehicle 100b is in the CC2 section of FIG. 4, the vehicle control device 10a of the system-provided vehicle 100b sets the target acceleration calculation intermediate value $\alpha_{tc}$ such that $\alpha_{tc}=k_{\alpha V}((V_{Rt}+V_d)-V)$ is established (S17g). That is, the vehicle control device 10a controls the system-provided vehicle 100b such that the inter-vehicle distance between the system-provided vehicle 100b and the general vehicle 200p which is immediately in front of the system-provided vehicle 100b is reduced and the system-provided vehicle 100b is moved from the CC2 section to the CC1 section.

In Step S17a, as shown in the case C2 of FIG. 4, when $L_C-L_R<L_{RL}$, is not satisfied and the general vehicle 200p which is immediately in front of the system-provided vehicle 100b is not within the predicted distance headway $L_{RL}$ (S17a), the vehicle control device 10a of the system-provided vehicle 100b performs Step S17e.

Figure 10:
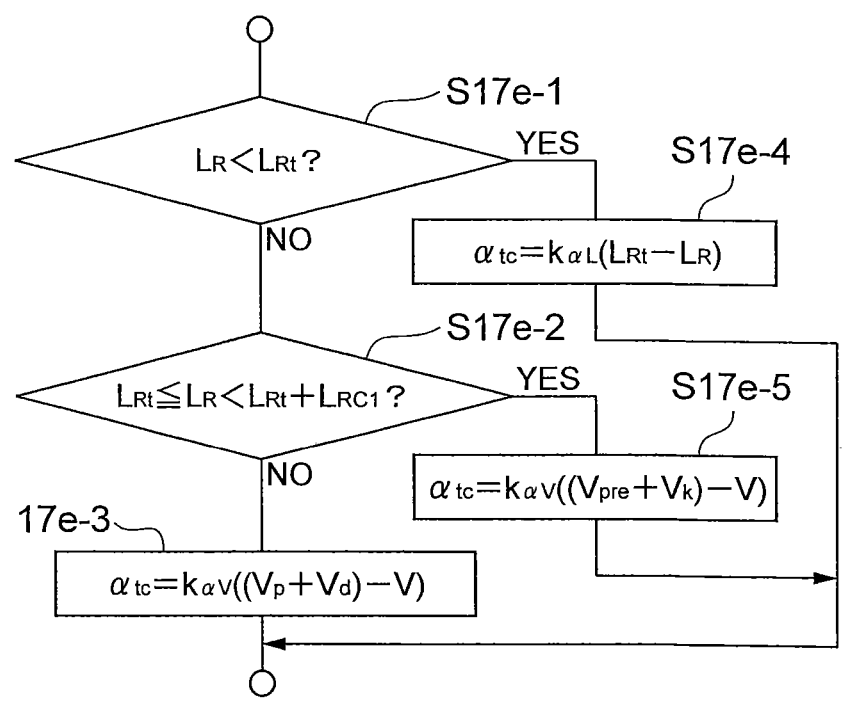
FIG. 10 is a flowchart illustrating the details of the operation of maintaining the guided vehicle speed and inter-vehicle distance.
Figure 11:
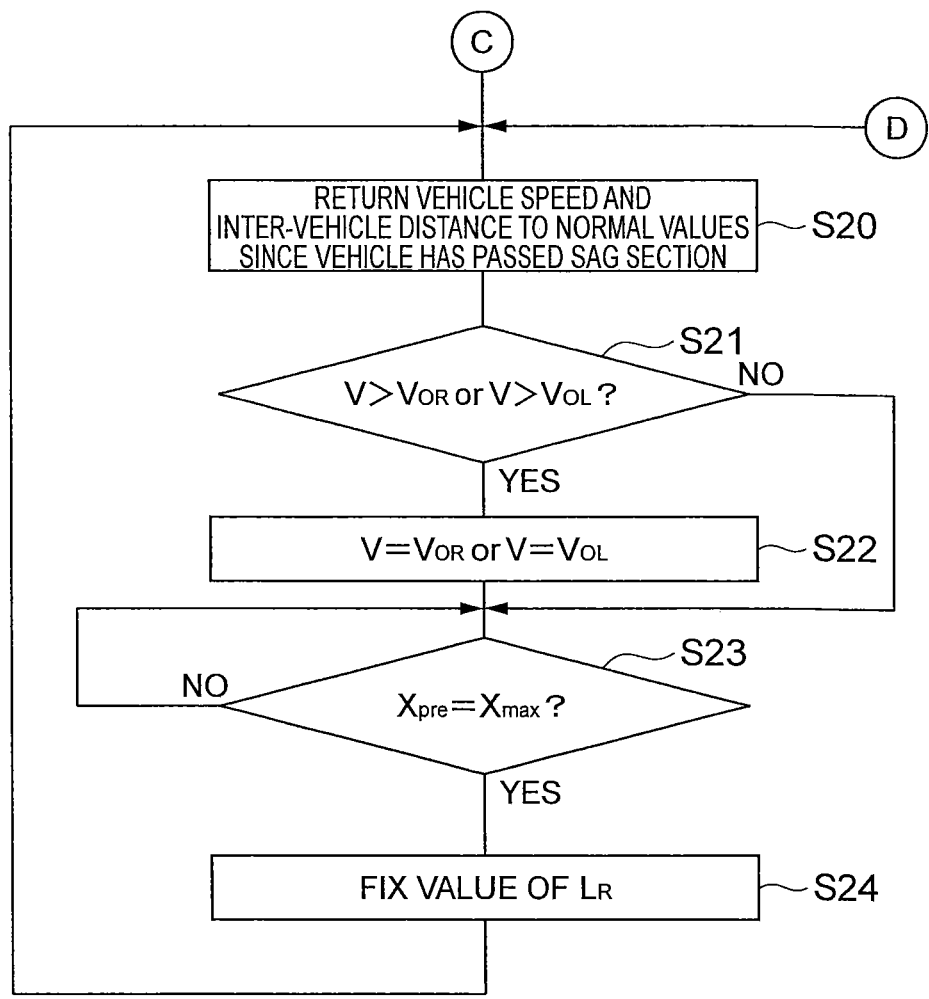
FIG. 11 is a flowchart illustrating an operation of returning the vehicle speed and the inter-vehicle distance to normal values since the vehicle passes through a sag section.

As shown in detail in FIG. 10, in Step S17e, when $L_R<L_{Rt}$ is not satisfied (S17e-1) and $L_{Rt} \leq L_R<L_{Rt}+L_{RC1}$ is not satisfied (where $L_{RC1}$ is the distance of the ACC2 section in which the relative vehicle speed is adjusted in the case C2) (S17e-2), that is, when the actual distance headway is more than the target distance headway and the system-provided vehicle 100b is out of the ACC2 section in which the relative vehicle speed is adjusted, the vehicle control device 10a of the system-provided vehicle 100b sets the target acceleration calculation intermediate value $\alpha_{tc}$ such that $\alpha_{tc}=k_{\alpha V}((V_p+V_d)-V)$ is established (S17e-3). That is, the vehicle control device 10a controls the system-provided vehicle 100b so as to move to the ACC2 section in the case C2 of FIG. 4.

In Step S17e-1, when $L_R<L_{Rt}$ is satisfied (S17e-1), that is, when the actual distance headway is less than the target distance headway and the system-provided vehicle 100b is in the ACC2 section, the vehicle control device 10a of the system-provided vehicle 100b sets the target acceleration calculation intermediate value $\alpha_{tc}$ such that $\alpha_{tc}=k_{\alpha L}(L_{Rt}-L_R)$ is established (S17e-3). That is, the vehicle control device 10a controls the system-provided vehicle 100b so as travel while maintaining the distance headway between the system-provided vehicle 100b and the general vehicle 200p which is immediately in front of the system-provided vehicle 100b to be the target inter-vehicle distance $L_{Rt}$.

In Step S17g-2, when $L_{Rt} \leq L_R < L_{Rt} + L_{RC1}$ is satisfied (S17e-2), that is, when the actual distance headway is more than the target distance headway and the system-provided vehicle 100b is in the ACC2 section in which the relative vehicle speed is adjusted, the vehicle control device 10a of the system-provided vehicle 100b sets the target acceleration calculation intermediate value $\alpha_{tc}$ such that $\alpha_{tc} = k_{\alpha V}((V_{pre} + V_k) - V)$ is established (where $V_k$ is a target value of the relative vehicle speed in the ACC section in which the relative vehicle speed is adjusted) (S17e-5). That is, the vehicle control device 10a controls the system-provided vehicle 100b such that the relative speed thereof to the general vehicle 200p is equal to the target value $V_k$ and the system-provided vehicle 100b moves to the ACC2 section in the case C2 of FIG. 4.

Returning to FIG. 9, when $\alpha_{tc} > \alpha_a$ or $\alpha_{tc} < \alpha_d$ is satisfied (S17h), that is, when the target acceleration calculation intermediate value $\alpha_{tc}$ is more than the maximum acceleration $\alpha_a$ or $\alpha_d$ of the acceleration side or the deceleration side, the vehicle control device 10a of the system-provided vehicle 100b sets the target acceleration $\alpha_t$ of the system-provided vehicle to be equal to the maximum acceleration $\alpha_a$ or $\alpha_d$ ($\alpha_t = \alpha_a$ or $\alpha_t = \alpha_d$) (S17i). When $\alpha_{tc} > \alpha_a$ or $\alpha_{tc} < \alpha_d$ is not satisfied (S17h), that is, when the target acceleration calculation intermediate value $\alpha_{tc}$ is not more than the maximum acceleration $\alpha_a$ or $\alpha_d$ of the acceleration side or the deceleration side, the vehicle control device 10a of the system-provided vehicle 100b sets the target acceleration $\alpha_t$ of the system-provided vehicle to be equal to the target acceleration calculation intermediate value $\alpha_{tc}$ ($\alpha_t = \alpha_{tc}$) (S17j).

Figure 9:
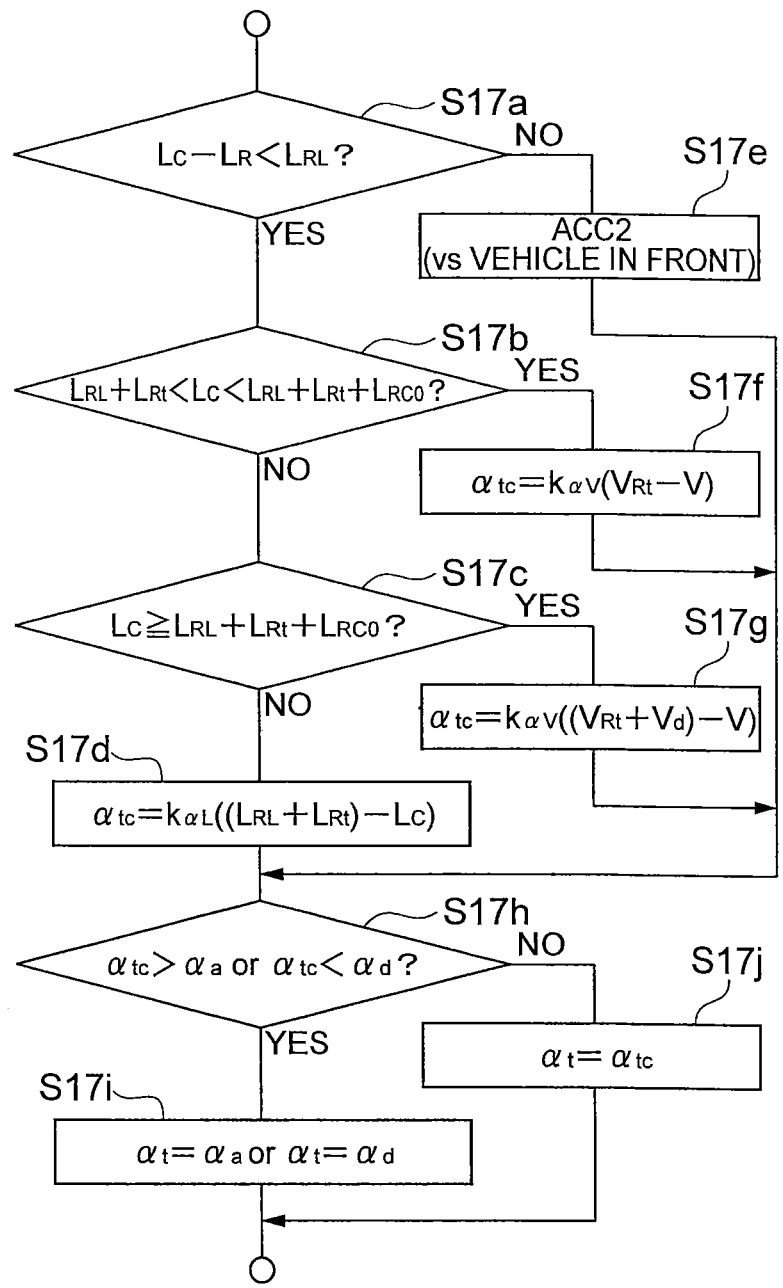
FIG. 9 is a flowchart illustrating the details of the operation of maintaining the guided vehicle speed and inter-vehicle distance.

As described with reference to FIGS. 8 to 10, after the vehicle control device 10a of the system-provided vehicle 100b performs control for maintaining the guided vehicle speed and inter-vehicle distance, it performs control for returning to a normal vehicle speed and inter-vehicle distance since the system-provided vehicle 100b has passed through the sag section, as shown in FIG. 8 (S20).

When the speed V of the system-provided vehicle 100b is more than the initial vehicle speed $V_{OR}$ or $V_{OL}$ ($V > V_{OR}$ or $V > V_{OL}$) (S21), the vehicle control device 10a of the system-provided vehicle 100b performs traveling control such that the speed V of the system-provided vehicle 100b is equal to the initial vehicle speed ($V = V_{OR}$ or $V = V_{OL}$) (S22). The position $X_{pre}$ of the general vehicle 200p which is immediately in front of the system-provided vehicle 100b reaches the final position $X_{max}$ of a controllable section (S23), the vehicle control device 10a of the system-provided vehicle 100b sets the distance $L_R$ from the general vehicle 200p which is immediately in front of the system-provided vehicle 100b to a fixed value (S24) and repeatedly performs Steps S20 to S23.

Figure 12:
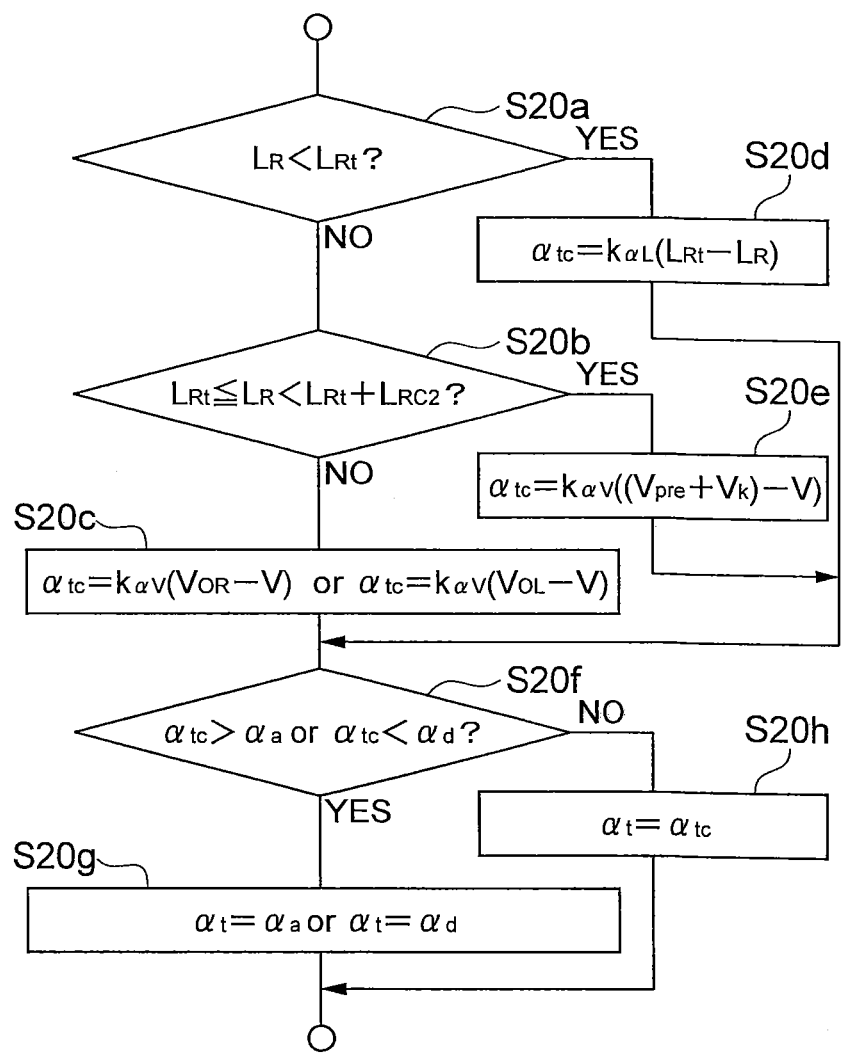
FIG. 12 is a flowchart illustrating the details of the operation of returning the vehicle speed and the inter-vehicle distance to the normal values since the vehicle passes through the sag section.

Next, the operation of returning the vehicle speed and the inter-vehicle distance to normal values since the system-provided vehicle 100b passes through the sag section in Step S20 will be described in detail. As shown in FIG. 12, when $L_R < L_{Rt}$ is not satisfied (S20a) and $L_{Rt} \leq L_R < L_{Rt} + L_{RC2}$ is not satisfied (where $L_{RC2}$ is the distance of the ACC section in which the relative vehicle speed is adjusted after the sag section ends (S20b), that is, when the actual distance headway is more than the target distance headway and the system-provided vehicle 100b is out of the ACC section in which the relative vehicle speed is adjusted after the sag section ends, the vehicle control device 10a of the system-provided vehicle 100b sets the target acceleration calculation intermediate value $\alpha_{tc}$ such that $\alpha_{tc} = k_{\alpha V}(V_{OR} - V)$ or $\alpha_{tc} = k_{\alpha V}(V_{OL} - V)$ is established (S20c). That is, the vehicle control device 10a controls the system-provided vehicle 100b so as to travel at the vehicle speed initial values $V_{OR}$ and $V_{OL}$ of each lane.

In Step S20a, when $L_R < L_{Rt}$ is satisfied (S20a), that is, the actual distance headway less than the target distance headway and the system-provided vehicle 100b is in an ACC section, the vehicle control device 10a of the system-provided vehicle 100b sets the target acceleration calculation intermediate value $\alpha_{tc}$ such that $\alpha_{tc} = k_{\alpha L}(L_{Rt} - L_R)$ is established (S20c). That is, the vehicle control device 10a controls the system-provided vehicle 100b so as to travel while maintaining the distance headway between the system-provided vehicle 100b and the general vehicle 200p which is immediately in front of the system-provided vehicle 100b to be the target inter-vehicle distance $L_{Rt}$.

In Step S21d, when $L_{Rt} \leq L_R < L_{Rt} + L_{RC2}$ is satisfied (S20b), that is, when the actual distance headway is more than the target distance headway and the system-provided vehicle 100b is in the ACC section in which the relative vehicle speed is adjusted after the sag section ends, the vehicle control device 10a of the system-provided vehicle 100b sets the target acceleration calculation intermediate value $\alpha_{tc}$ such that $\alpha_{tc} = k_{\alpha V}((V_{pre} + V_k) - V)$ is established (where $V_k$ is the target value of the relative vehicle speed in the ACC section in which the relative vehicle speed is adjusted (S20e). That is, the vehicle control device 10a controls the system-provided vehicle 100b such that the relative speed thereof to the general vehicle 200p which is immediately in front of the system-provided vehicle 100b is the target value $V_k$ and the system-provided vehicle 100b moves to the ACC section.

When $\alpha_{tc} > \alpha_a$ or $\alpha_{tc} < \alpha_d$ is satisfied (S20f), that is, when the target acceleration calculation intermediate value $\alpha_{tc}$ is more than the maximum acceleration $\alpha_a$ or $\alpha_d$ of the acceleration side or the deceleration side, the vehicle control device 10a of the system-provided vehicle 100b sets the target acceleration $\alpha_t$ of the system-provided vehicle to be equal to the maximum acceleration $\alpha_a$ or $\alpha_d$ ($\alpha_t = \alpha_a$ or $\alpha_t = \alpha_d$) (S20g). When $\alpha_{tc} > \alpha_a$ or $\alpha_{tc} < \alpha_d$ is not satisfied (S20f), that is, when the target acceleration calculation intermediate value $\alpha_{tc}$ is not more than the maximum acceleration $\alpha_a$ or $\alpha_d$ of the acceleration side or the deceleration side, the vehicle control device 10a of the system-provided vehicle 100b sets the target acceleration $\alpha_t$ of the system-provided vehicle to be equal to the target acceleration calculation intermediate value $\alpha_{tc}$ ($\alpha_t = \alpha_{tc}$) (S20h).

Figure 13:
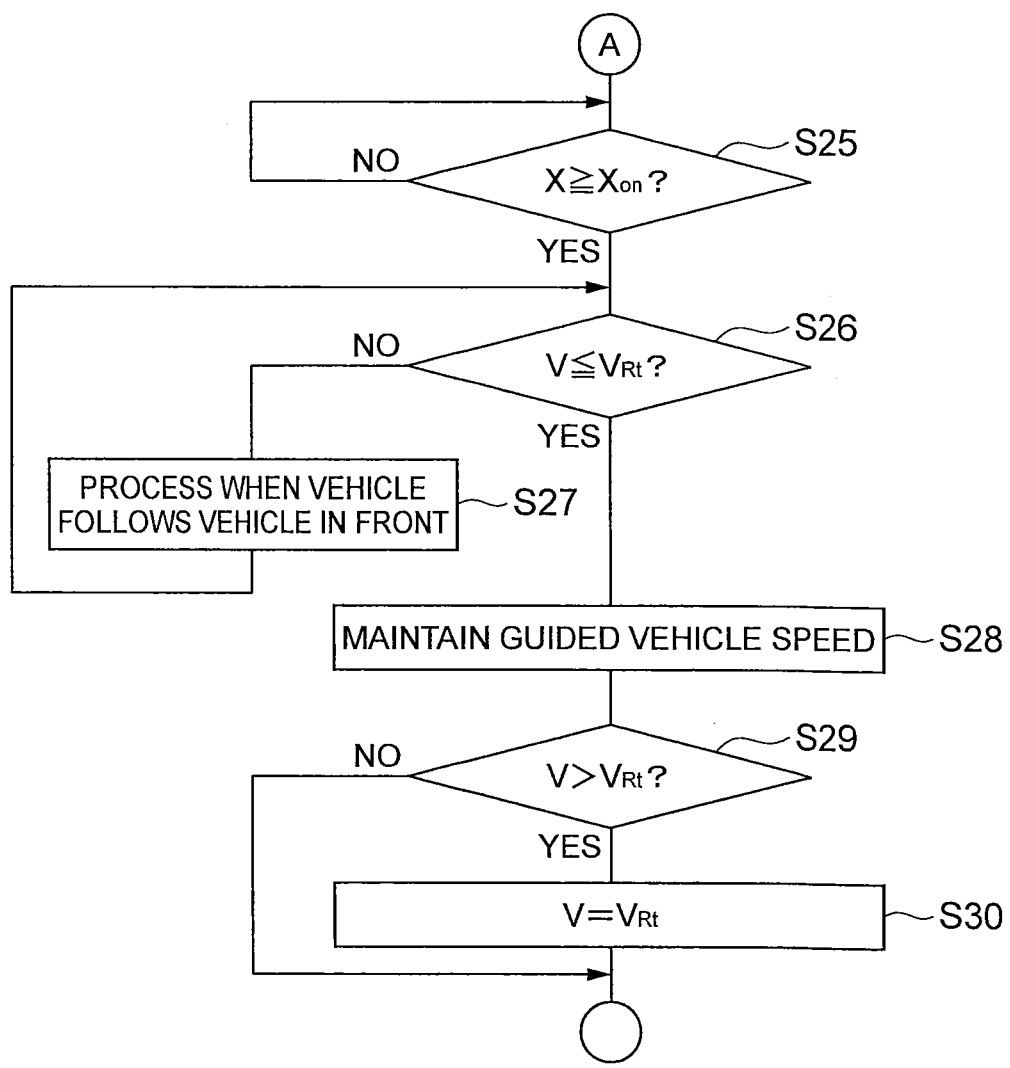
FIG. 13 is a flowchart illustrating a control operation for a first communication vehicle in each lane.

Next, the operation of the first system-provided vehicle 100a in each lane in a given section shown in FIG. 4 will be described (S11). As shown in FIG. 13, when the coordinate X of the system-provided vehicle 100a in the traveling direction reaches a position $X_{on}$ where vehicle speed control starts (S25) and the speed V of the system-provided vehicle 100a is more than the target vehicle speed $V_{Rt}$ ($V \leq V_{Rt}$) (S26), the vehicle control device 10a of the system-provided vehicle 100a performs a process when the system-provided vehicle 100a has followed the vehicle in front (S27).

Figure 14:
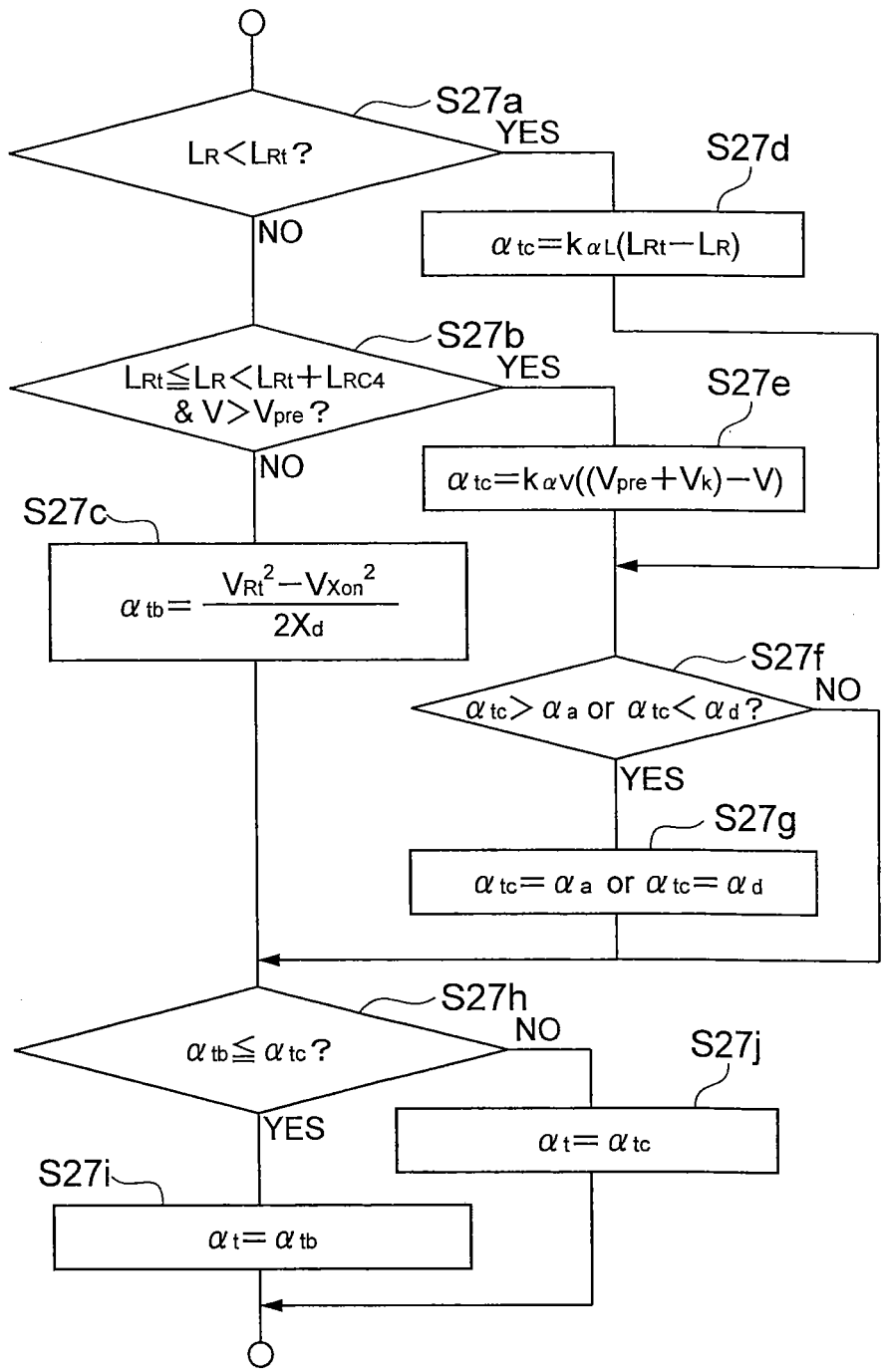
FIG. 14 is a flowchart illustrating an operation when the vehicle follows the leading vehicle.

Next, the process when the system-provided vehicle 100a has followed the vehicle in front Step S27 will be described in detail. As shown in FIG. 14, when $L_R < L_{Rt}$ is not satisfied (S27a) and $L_{Rt} L_R < L_{Rt} + L_{RC4}$ and $V > V_{pre}$ are not satisfied (where $L_{RC4}$ is the distance of the ACC section in which the relative vehicle speed is adjusted during the guidance of the first system-provided vehicle 100a) (S27b), that is, when the actual distance headway is more than the target distance headway, the system-provided vehicle 100a is out of the ACC section in which the relative vehicle speed is adjusted during the guidance of the first system-provided vehicle 100a, the speed V of the system-provided vehicle 100a is less than the speed $V_{pre}$ of the general vehicle 200p which is immediately in front of the system-provided vehicle 100a, the vehicle control device 10a of the system-provided vehicle 200a sets the target acceleration calculation intermediate value $\alpha_{tb}$ such that $\alpha_{tb}=(V_{Rt}^2-V_{Xon}^2)/2X_d$ is established (S27c).

$V_{Xon}$ is the speed of the first system-provided vehicle 100a in each lane when the first system-provided vehicle 100a passes through the position $X_{on}$ and $X_d$ is the distance of the section in which the first system-provided vehicle 100a is initially decelerated. That is, the vehicle control device 10a controls the traveling of the system-provided vehicle 100a such that the vehicle speed is $V_{Rt}$ only in the initial section corresponding to the distance $X_d$.

In Step S27a, when $L_R<L_{Rt}$ is satisfied (S27a), that is, the actual distance headway is less than the target distance headway and the system-provided vehicle 100a is in the ACC section, the vehicle control device 10a of the system-provided vehicle 100a sets the target acceleration calculation intermediate value $\alpha_{tc}$ such that $\alpha_{tc}=k_{\alpha L}(L_{Rt}-L_R)$ is established (S27c). That is, the vehicle control device 10a controls the system-provided vehicle 100a so as to travel while maintaining the distance headway between the system-provided vehicle 100a and the general vehicle 200p which is immediately in front of the system-provided vehicle 100a to be the target inter-vehicle distance $L_{Rt}$.

In Step S27b, when $L_{Rt} \le L_R < L_{Rt}+L_{RC4}$ and $V>V_{pre}$ are satisfied (S27b), that is, the actual distance headway is more than the target distance headway, the first system-provided vehicle 100a is out of the ACC section in which the relative vehicle speed is adjusted during guidance, and the speed V of the first system-provided vehicle 100a is more than the speed $V_{pre}$ of the general vehicle 200p in front, the vehicle control device 10a of the system-provided vehicle 100a sets the target acceleration calculation intermediate value $\alpha_{tc}$ such that $\alpha_{tc}=k_{\alpha V}((V_{pre}+V_k)-V)$ is established (where $V_k$ is a target value of the relative vehicle speed in the ACC section in which the relative vehicle speed is adjusted (S27e). That is, the vehicle control device 10a controls the system-provided vehicle 100a such that the relative speed thereof to the general vehicle 200p immediately in front is equal to the target value $V_k$ and the system-provided vehicle 100a moves to the ACC section.

In Steps S27d and S27e, when $\alpha_{tc}>\alpha_a$ or $\alpha_{tc}<\alpha_d$ is satisfied (S27f), that is, the target acceleration calculation intermediate value $\alpha_{tc}$ is more than the maximum acceleration $\alpha_a$ or $\alpha_d$ of the acceleration side or the deceleration side, the vehicle control device 10a of the system-provided vehicle 100a sets the target acceleration $\alpha_t$ of the system-provided vehicle to be equal to the maximum acceleration $\alpha_a$ or $\alpha_d$ ($\alpha_t=\alpha_a$ or $\alpha_t=\alpha_d$) (S27g).

In Step S27c, S27f, or S27g, when $\alpha_{tb} \le \alpha_{tc}$ is satisfied (S27h), the vehicle control device 10a of the system-provided vehicle 100a sets the target acceleration $\alpha_t$ such that $\alpha_t=\alpha_{tb}$ is established (S27i). In Step S27c, S27f, or S27g, when $\alpha_{tb}>\alpha_{tc}$ is satisfied (S27h), the vehicle control device 10a of the system-provided vehicle 100a sets the target acceleration $\alpha_t$ such that $\alpha_t=\alpha_{tc}$ is established (S27j).

Returning to FIG. 13, in Step S26, when the speed V of the system-provided vehicle 100a is equal to or less than the target vehicle speed $V_{Rt}$ ($V \le V_{Rt}$) (S26), the vehicle control device 10a of the system-provided vehicle 100a performs control to maintain the guided vehicle speed (S28).

Figure 15:
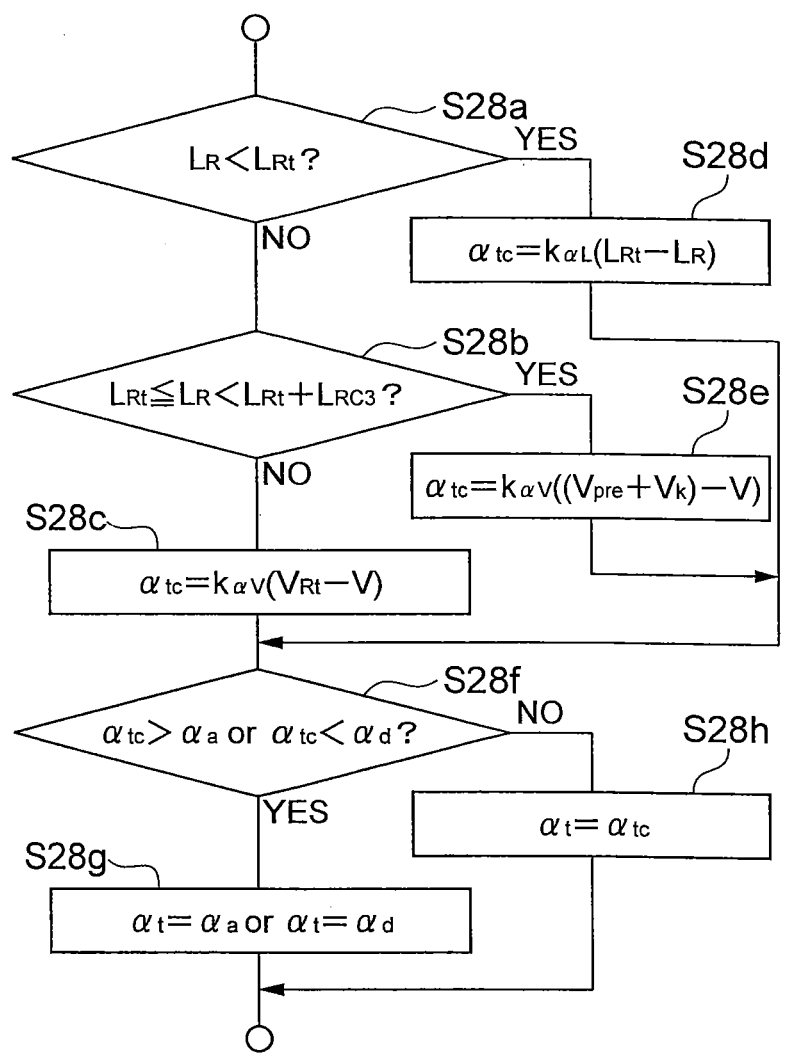
FIG. 15 is a flowchart illustrating an operation of maintaining the guided vehicle speed.

Next, the control process of maintaining the guided vehicle speed in Step S28 will be described in detail. As shown in FIG. 15, when $L_R<L_{Rt}$ is not satisfied (S28a) and $L_{Rt} \le L_R<L_{Rt}+L_{R0}$ is not satisfied (where $L_{RC3}$ is the distance of the ACC section in which the relative vehicle speed is adjusted when the speed of the first system-provided vehicle 100a is maintained) (S28b), that is, when the actual distance headway is more than the target distance headway and the first system-provided vehicle 100a is out of the ACC section in which the relative vehicle speed is adjusted when the vehicle speed is maintained, the vehicle control device 10a of the system-provided vehicle 100a sets the target acceleration calculation intermediate value $\alpha_{tc}$ such that $\alpha_{tc}=k_{\alpha V}(V_{Rt}-V)$ is established (S28c). That is, the vehicle control device 10a controls the system-provided vehicle 100a so as to travel at the target vehicle speed $V_{Rt}$.

In Step S29a, when $L_R<L_{Rt}$ is satisfied (S28a), that is, the actual distance headway is less than the target distance headway and the system-provided vehicle 100a is in the ACC section, the vehicle control device 10a of the system-provided vehicle 100a sets the target acceleration calculation intermediate value $\alpha_{tc}$ such that $\alpha_{tc}=k_{\alpha L}(L_{Rt}-L_R)$ is established (S28d). That is, the vehicle control device 10a controls the system-provided vehicle 100a so as to travel while maintaining the distance headway between the system-provided vehicle 100a and the general vehicle 200p immediately in front to be the target inter-vehicle distance $L_{Rt}$.

In Step S28b, when $L_{Rt} \le L_R<L_{Rt}+L_{RC3}$ is satisfied (S28b), that is, when the actual distance headway is more than the target distance headway and the system-provided vehicle 100a is in the ACC section in which the relative vehicle speed is adjusted during the maintenance of the vehicle speed, the vehicle control device 10a of the system-provided vehicle 100a sets the target acceleration calculation intermediate value $\alpha_{tc}$ such that $\alpha_{tc}=k_{\alpha V}((V_{pre}+V_k)-V)$ is established (where $V_k$ is the target value of the relative vehicle speed in the ACC section in which the relative vehicle speed is adjusted) (S28e). That is, the vehicle control device 10a controls the system-provided vehicle 100a such that the relative speed thereof to the general vehicle 200p immediately in front is equal to the target value $V_k$ and the system-provided vehicle 100a moves to the ACC section.

When $\alpha_{tc}>\alpha_a$ or $\alpha_{tc}<\alpha_d$ is satisfied (S28f), that is, the target acceleration calculation intermediate value $\alpha_{tc}$ is more than the maximum acceleration $\alpha_a$ or $\alpha_d$ of the acceleration side or the deceleration side, the vehicle control device 10a of the system-provided vehicle 100a sets the target acceleration $\alpha_t$ of the system-provided vehicle to be equal to the maximum acceleration $\alpha_a$ or $\alpha_d$ ($\alpha_t=\alpha_a$ or $\alpha_t=\alpha_d$) (S28g). When $\alpha_{tc}>\alpha_a$ or $\alpha_{tc}<\alpha_d$ is not satisfied (S28f), that is, when the target acceleration calculation intermediate value $\alpha_{tc}$ is not more than the maximum acceleration $\alpha_a$ or $\alpha_d$ of the acceleration side or the deceleration side, the vehicle control device 10a of the system-provided vehicle 100a sets the target acceleration $\alpha_t$ of the system-provided vehicle to be equal to the target acceleration calculation intermediate value $\alpha_{tc}$ ($\alpha_t=\alpha_{tc}$) (S28h).

Returning to FIG. 13, when $V>V_{Rt}$ is satisfied, that is, when the speed V of the system-provided vehicle 100a is more than the target vehicle speed $V_{Rt}$ (S29), the vehicle control device 10a of the system-provided vehicle 100a sets the speed V to be equal to $V_{Rt}$ and controls the system-provided vehicle 100a so as to travel using the speed $V=V_{Rt}$ as the upper limit speed.

The amount of traffic on the road is greatly affected by both the inter-vehicle distance and the vehicle speed. According to this embodiment, when the amount of traffic is increases and is more than a threshold value, the ECU 20 and the ACC 30 controls the inter-vehicle distance and the vehicle speed such that the amount of traffic becomes a value equal to or more than the threshold value. In this way, it is possible to effectively suppress traffic congestion.

In this embodiment, the ECU 20 and the ACC 30 changes the inter-vehicle distance and the vehicle speed such that the amount of traffic is equal to or more than the threshold value, according to the number of system-provided vehicles 100a or 100b which can communicate with the system-provided vehicle 100a or 100b, which is the host vehicle, and have high flexibility in the control of the inter-vehicle distance and the vehicle speed by the host vehicle. Therefore, it is possible to suppress traffic congestion according to the actual situation.

In this embodiment, the ECU 20 and the ACC 30 changes the inter-vehicle distance such that the amount of traffic is equal to or more than the threshold value, according to the number N of general vehicles 200 disposed between the system-provided vehicles 100a or 100b which can communicate with the system-provided vehicle 100a or 100b, which is the host vehicle, and have low flexibility in the control of the inter-vehicle distance and the vehicle speed by the host vehicle. Therefore, it is possible to perform vehicle control considering the actual traffic conditions and traffic flow.

In this embodiment, the ECU 20 and the ACC 30 change the threshold value for starting the control of the inter-vehicle distance and the vehicle speed, depending on the region including the road. Therefore, for example, when the road is in the region in which traffic congestion occurs frequently, such as a sag section, the ECU 20 and the ACC 30 change the threshold value depending on the region. Therefore, it is possible to effectively suppress traffic congestion.

Figure 16:
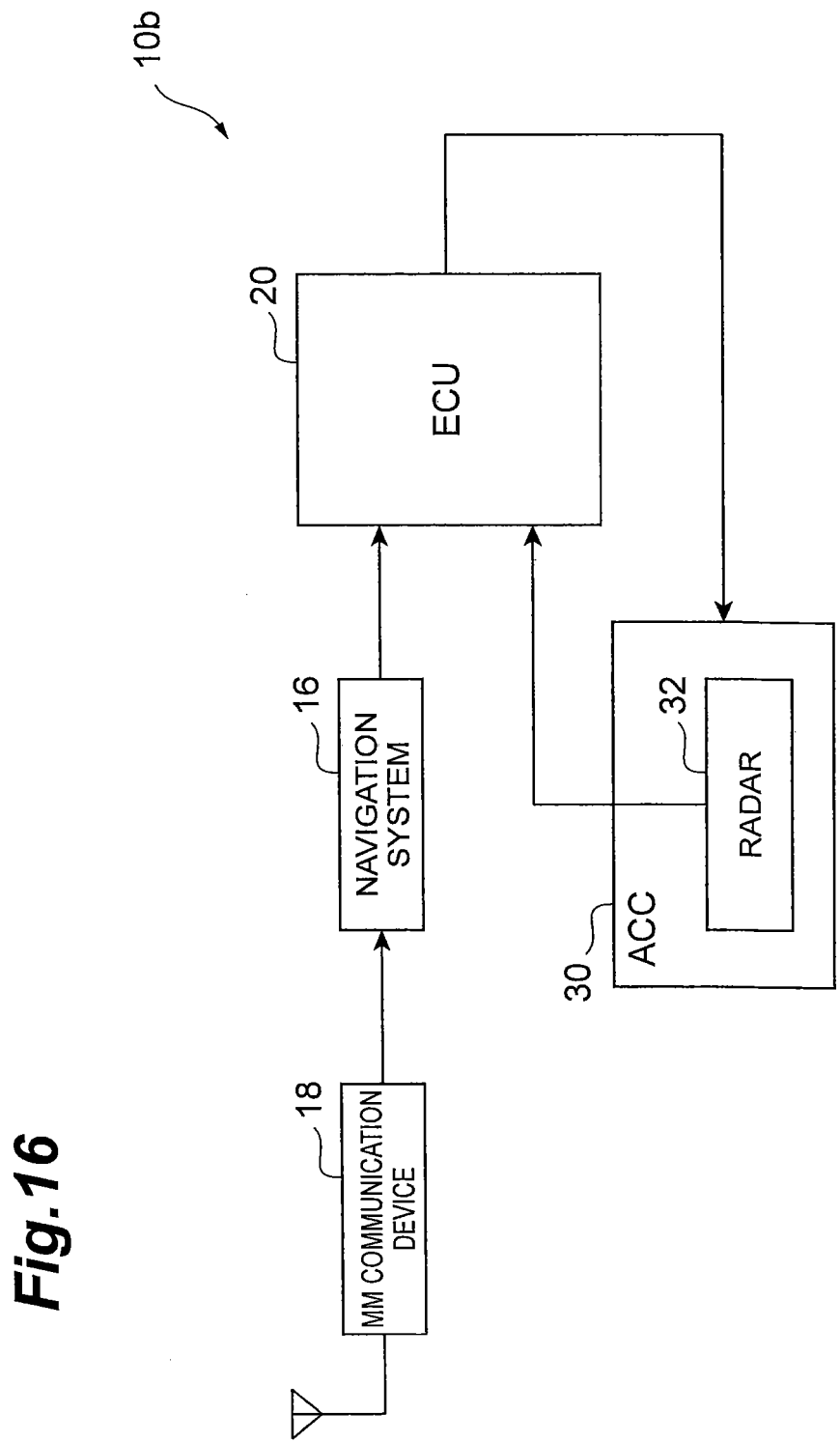
FIG. 16 is a block diagram illustrating the structure of a vehicle control device according to a second embodiment.

Next, a second embodiment of the invention will be described. As shown in FIG. 16, a vehicle control device 10b according to this embodiment differs from the vehicle control device according to the first embodiment in that it does not include the vehicle-to-vehicle communication device 12 and the road-to-vehicle communication device 14 and an MM (Multimedia) communication device 18 is connected to the navigation system 16. The MM communication device 18 is for receiving information related to the penetration rate of the system-provided vehicles 100a and 100b transmitted from a predetermined management center.

In this embodiment, the vehicle control device does not have a communication function, but the system-provided vehicle having a vehicle speed and inter-vehicle distance control function, such as the function of an ACC 30, predicts the percentage of the system-provided vehicles from information related to the penetration rate of the system-provided vehicles received by the MM communication device 18, predicts the number of general vehicles disposed between the system-provided vehicles on the basis of the predicted percentage, and adjusts the inter-vehicle distance using the sum of the inter-vehicle distances as the upper limit, similarly to the first embodiment. Therefore, in this embodiment, it is possible to perform vehicle control for preventing traffic congestion, without a communication function or even in the section other than the communicable range.

Figure 17:
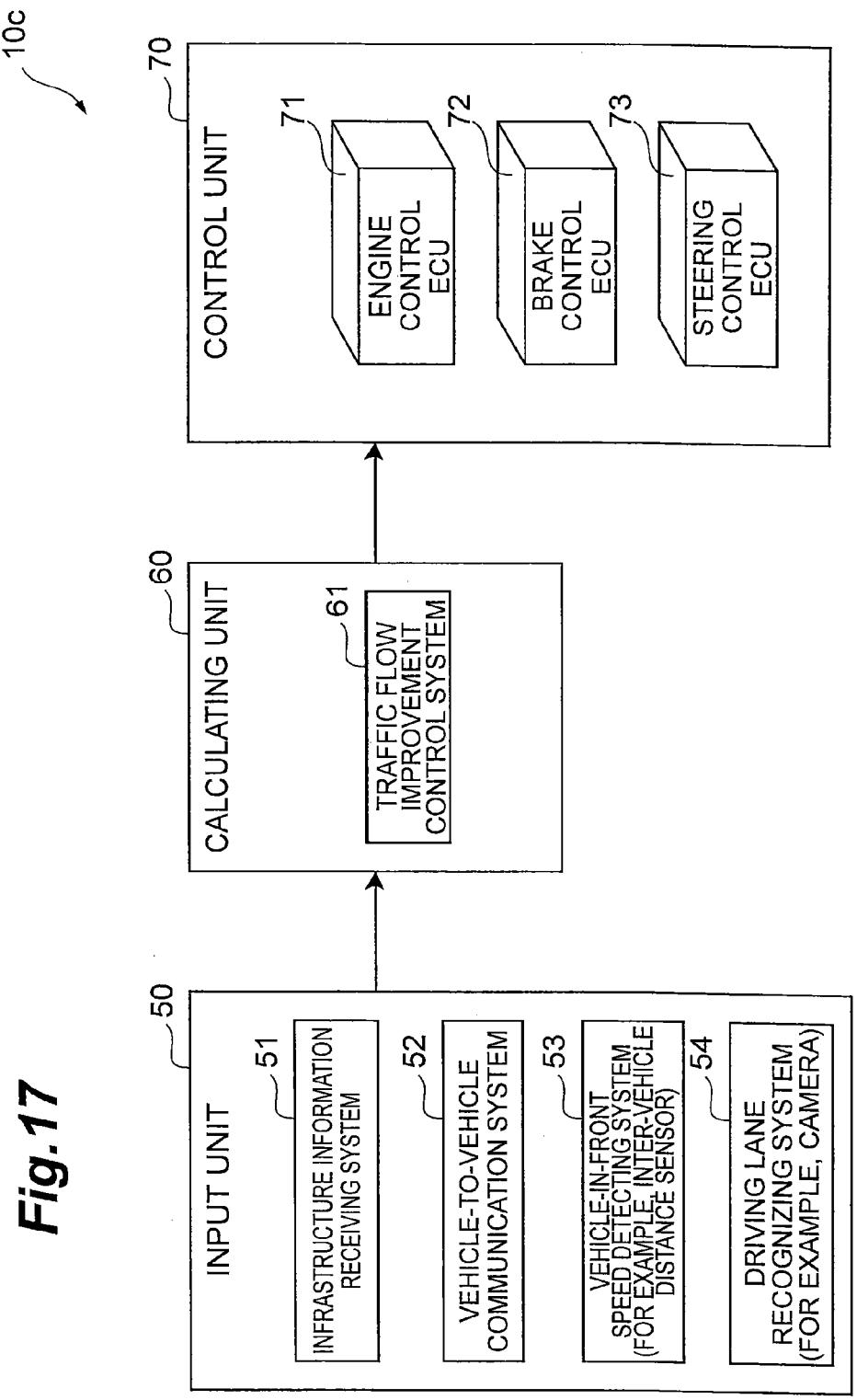
FIG. 17 is a block diagram illustrating the structure of a vehicle control device according to a third embodiment.

Next, a third embodiment of the invention will be described. In this embodiment, vehicle control is performed to uniformly distribute the vehicles traveling in the lane, thereby preventing traffic congestion. As shown in FIG. 17, a vehicle control device 10c according to this embodiment is provided in a vehicle and includes an input unit 50, a calculating unit 60, and a control unit 70.

The input unit 50 includes an infrastructure information receiving system 51, a vehicle-to-vehicle communication system 52, a vehicle-in-front speed detecting system 53, and a driving lane recognizing system 54. The infrastructure information receiving system 51 receives information, such as the average speed of the road in each lane, the amount of traffic (the number of vehicles per unit time), and the possibility of traffic congestion transmitted from, for example, a management center, from an optical beacon communication device, which is a road infrastructure. The vehicle-to-vehicle communication system 52 performs vehicle-to-vehicle communication to transmit or receive information about the position or speed system-provided vehicles other than the host vehicle, or information about whether to turn on or off vehicle control for preventing traffic congestion. Specifically, the vehicle-in-front speed detecting system 53 is, for example, an inter-vehicle distance sensor that measures the distance from the vehicle in front. The traveling lane recognizing system 54 detects the lane in which the host vehicle travels using an autonomous sensor, such as a camera.

The calculating unit 60 includes a traffic flow improvement control system 61. The traffic flow improvement control system 61 performs control for improving the traffic flow of the road on the basis of various kinds of information acquired by the input unit 50. The control unit 70 includes an engine control ECU 71 that controls an engine on the basis of a command signal from the calculating unit 60, a brake control ECU 72 that controls a brake, and a steering control ECU 73 that controls steering.

Figure 18:
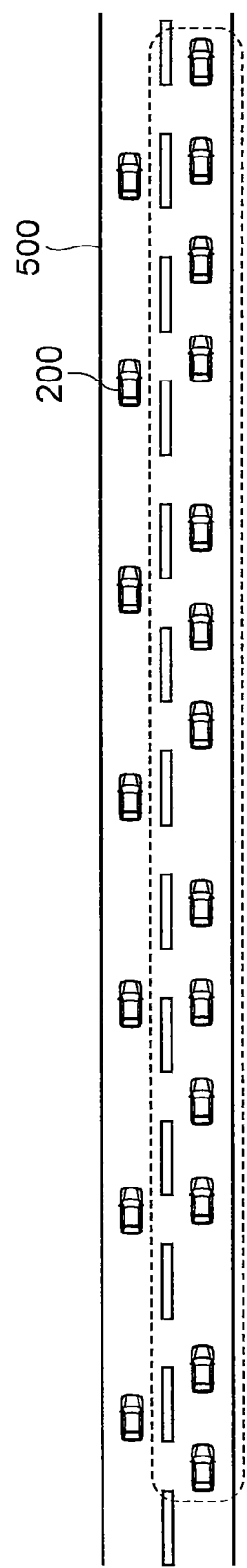
FIG. 18 is a plan view illustrating an example of a situation in which the vehicle control device according to the third embodiment is applied.

Next, the operation of the vehicle control device 10c according to this embodiment will be described. First, as a premise, a situation in which the vehicle control device 10c according to this embodiment is applied will be described. As shown in FIG. 18, it is assumed that the amount of traffic increases immediately before traffic congestion occurs in a road 500. In this case, as shown in a portion surrounded by a dashed line in FIG. 18, the general vehicles 200 that quicken their pace are concentrated on the driving lane. In this state, when there is a vehicle which reduces its speed due to, for example, a sag section, traffic congestion occurs.

Figure 19:
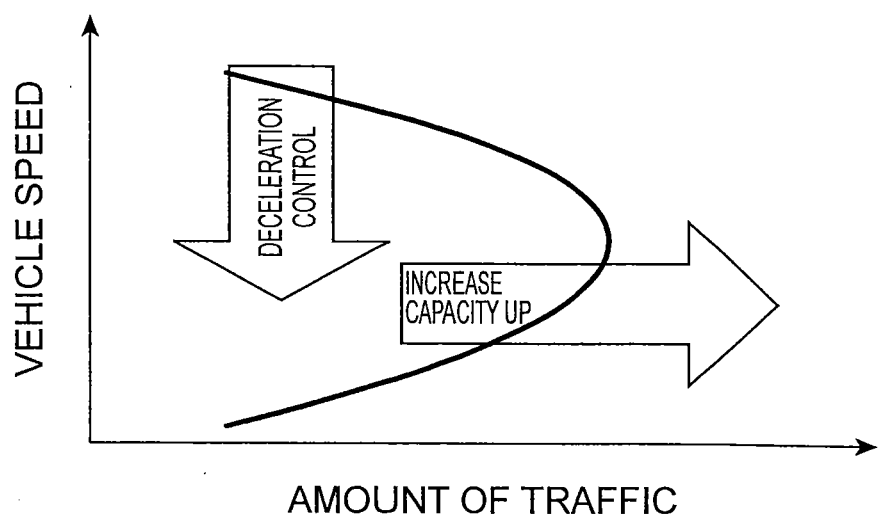
FIG. 19 is a graph illustrating the relationship between a speed and the amount of traffic when the driver performs an operation.

As shown in FIG. 19, statistical data proved that the traffic capacity of the road increased more effectively when the vehicles traveled in the low speed range than when the vehicles traveled at the maximum speed. Therefore, in this embodiment, traffic congestion is prevented by the following procedure.

Figure 20:
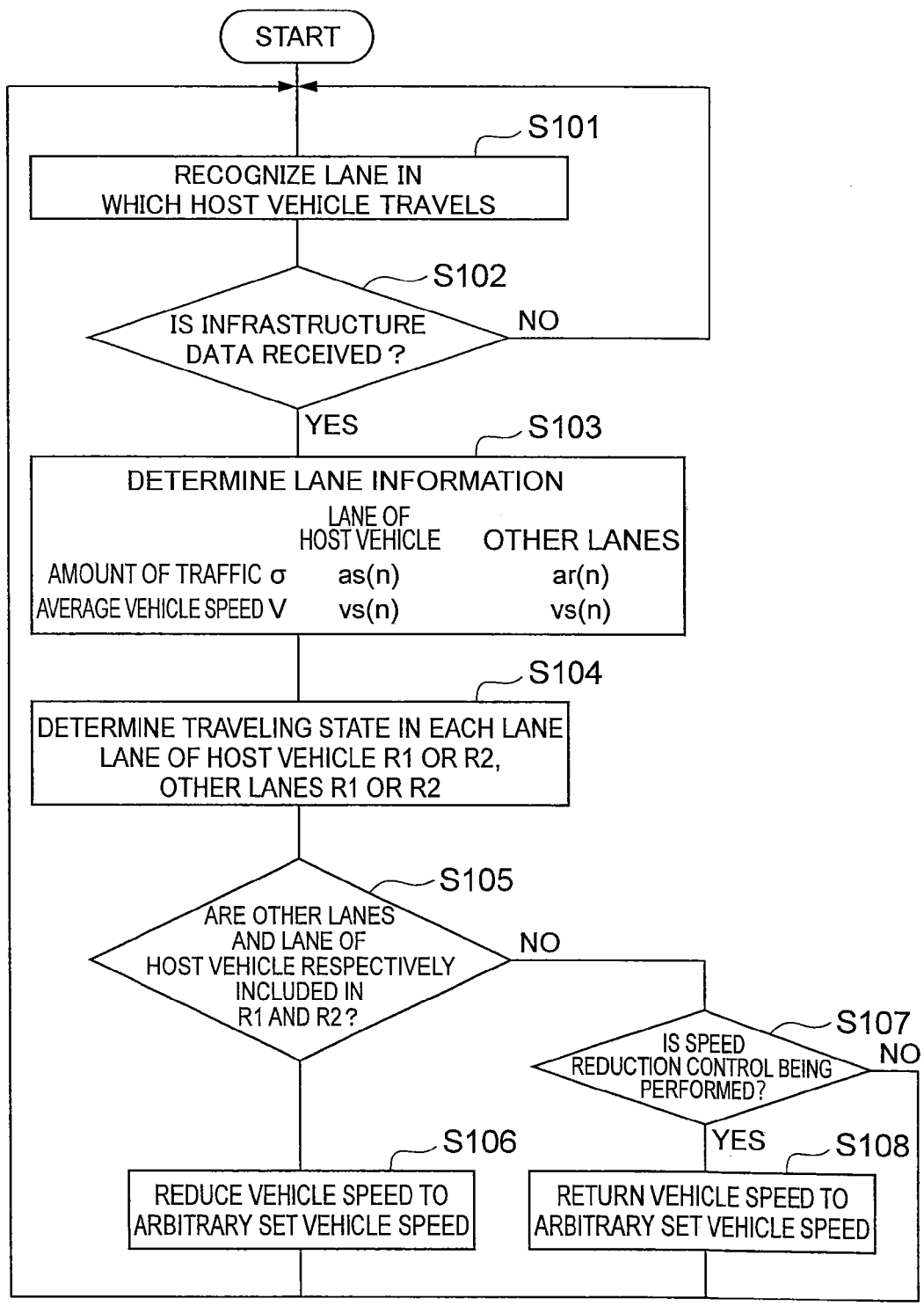
FIG. 20 is a flowchart illustrating the operation of the vehicle control device according to the third embodiment.
Figure 23:
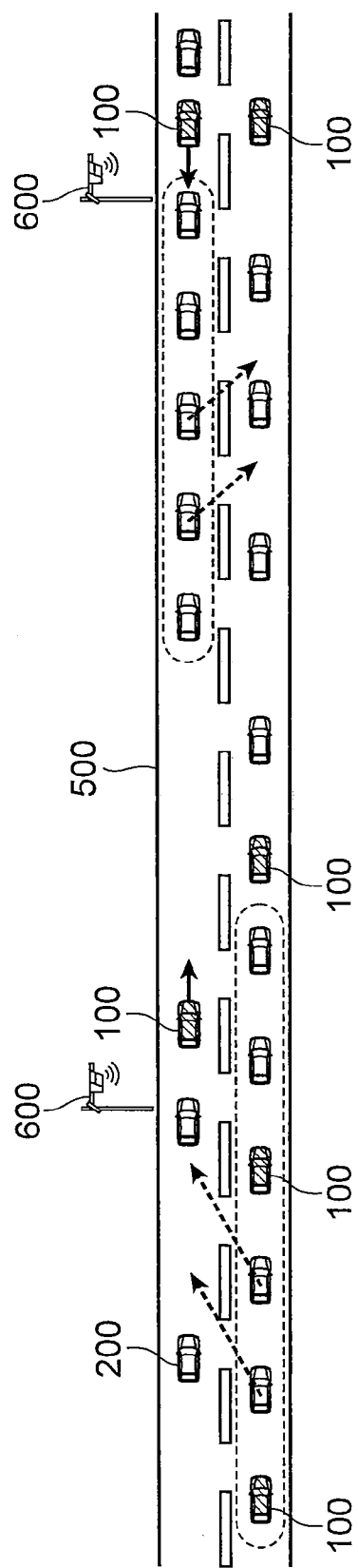
FIG. 23 is a plan view illustrating the operation of the vehicle control device according to the third embodiment.

As shown in FIGS. 20 and 23, a system-provided vehicle 100 including the vehicle control device 10c recognizes the lane in which the host vehicle travels using the traveling lane recognizing system 54 (S101). An optical beacon communication device transmits the traffic conditions, such as the number of vehicles per unit time in each lane and the average speed detected by a road infrastructure 600 and the system-provided vehicle 100 receives the traffic conditions using the infrastructure information receiving system 51 (S102). In the example shown in FIG. 23, as shown in a portion surrounded by a dashed line on the left side of FIG. 23, the general vehicle changes its lane to the driving lane which is on the left side in the traveling direction and the vehicles are concentrated on the driving lane.

Figure 21:
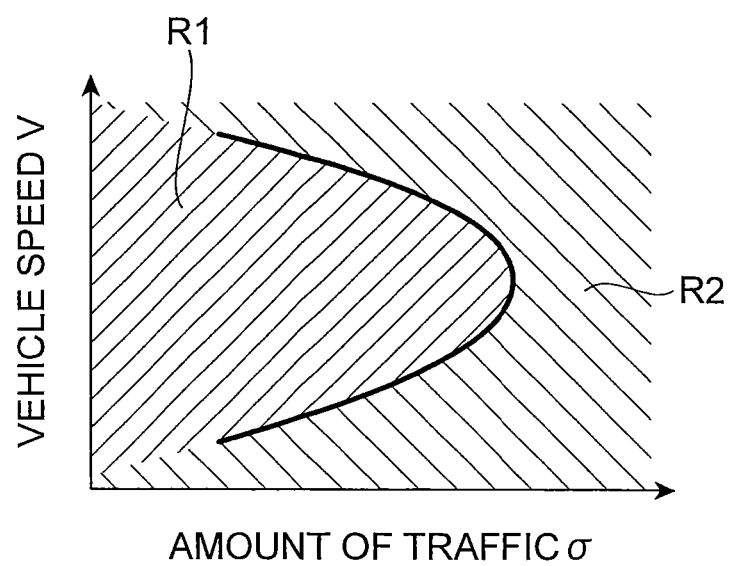
FIG. 21 is graph illustrating the relationship between the amount of traffic and the vehicle speed.

The traffic flow improvement control system 61 of the calculating unit 60 compares various kinds of information of each lane acquired by the input unit 50, such as the amount of traffic σ=as(n) of the lane of the host vehicle, the amount of traffic σ=ar(n) of other lanes, the average vehicle speed V=vs(n) of the lane of the host vehicle, and the average vehicle speed V=vr(n) of other lanes (S103). The traffic flow improvement control system 61 of the calculating unit 60 determines which of a region R1 and a region R2 includes the traffic conditions of the lane of the host vehicle and which of the regions R1 and R2 includes the traffic conditions of other lanes in the map shown in FIG. 21 (S104). This determination may be performed by the road infrastructure and the determination result may be transmitted to the system-provided vehicle 100.

When other lanes are included in the region R1 and the lane of the host vehicle is included in the region R2, that is, when the amount of traffic of the lane of the host vehicle is more than the amount of traffic of other lane (S105), the traffic flow improvement control system 61 performs control to reduce the speed of the host vehicle to an arbitrary set vehicle speed (S106). In this case, the traffic flow improvement control system 61 reduces the speed of the host vehicle by a predetermined value V1. The traffic flow improvement control system 61 sufficiently reduces acceleration −a1. Alternatively, in this case, the traffic flow improvement control system 61 may reduce the speed of the host vehicle by V2 with respect to the average vehicle speed vr(n) of other lanes. When both the lane of the host vehicle and other lanes are included in the region R2, the amount of traffic of the lane of the host vehicle may be more than that of other lanes.

In this case, as shown in a portion surrounded by a dashed lie on the right side of FIG. 23, since the speed of the lane of the host vehicle is reduced and the amount of traffic of another adjacent lane is less than the amount of traffic of the lane of the host vehicle, the host vehicle is guided to change its lane to another adjacent lane. In this case, when the concentration of the vehicles on the lane of the host vehicle is not removed, the traffic flow improvement control system 61 reduces the speed of the host vehicle again.

When other lanes are included in the region R1 and the lane of the host vehicle is not included in the region R2, that is, when the amount of traffic of the lane of the host vehicle is not more than the amount of traffic of other lanes and the concentration of the vehicles on the lane of the host vehicle is removed (S107), during speed reduction control (S108), the traffic flow improvement control system 61 gradually returns the vehicle speed to an arbitrary set vehicle speed while detecting the distance from the vehicle in front using the vehicle-in-front speed detecting system 53 (S109). The reason is that, when the vehicle speeds are alternately reduced in each lane, the vehicle speed becomes too low.

Figure 22:
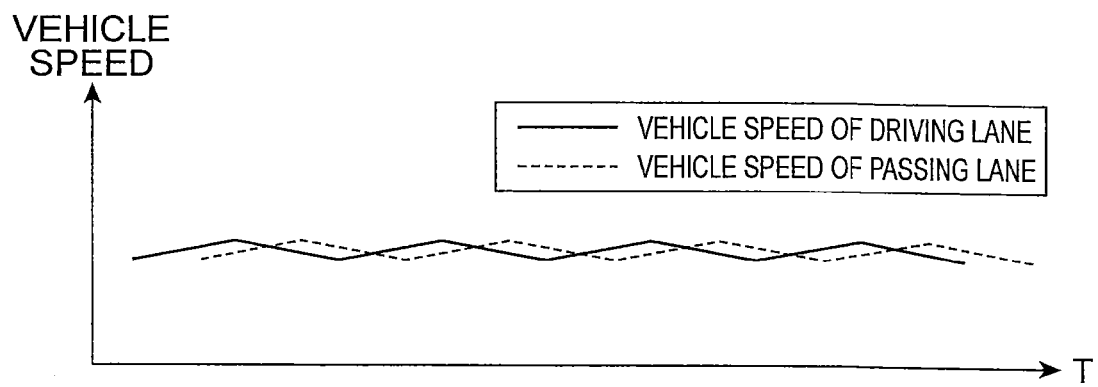
FIG. 22 is a graph illustrating a change in the vehicle speed in a driving lane and the vehicle speed in a passing lane.

In this case, the traffic flow improvement control system 61 returns the speed of the host vehicle to the value before the speed reduction control is performed. In addition, in this case, the traffic flow improvement control system 61 sufficiently reduces acceleration a2. In addition, the traffic flow improvement control system 61 increases the speed of the host vehicle by V2 with respect to the average vehicle speed vr(n) of other lanes. Alternatively, the traffic flow improvement control system 61 may set the speed of the host vehicle to be equal to the average vehicle speed vr(n) of other lanes. As shown in FIG. 22, the vehicle speeds of the driving lane and the passing lane are alternately increased and decreased by the above-mentioned control operation and the concentration of the vehicles on the lane is removed.

In addition, a situation in which information cannot be acquired from the road infrastructure is considered. In this case, the vehicle tends to move to the lane in which the average speed is more than that in other lanes. Therefore, it is possible to reduce the concentration of the vehicles on the lane by sharing information, which is related to the lane and speed of the vehicles traveling, between the system-provided vehicles 100 using the vehicle-to-vehicle communication system 52 and alternately increasing and decreasing the vehicle speed.

Figure 24:
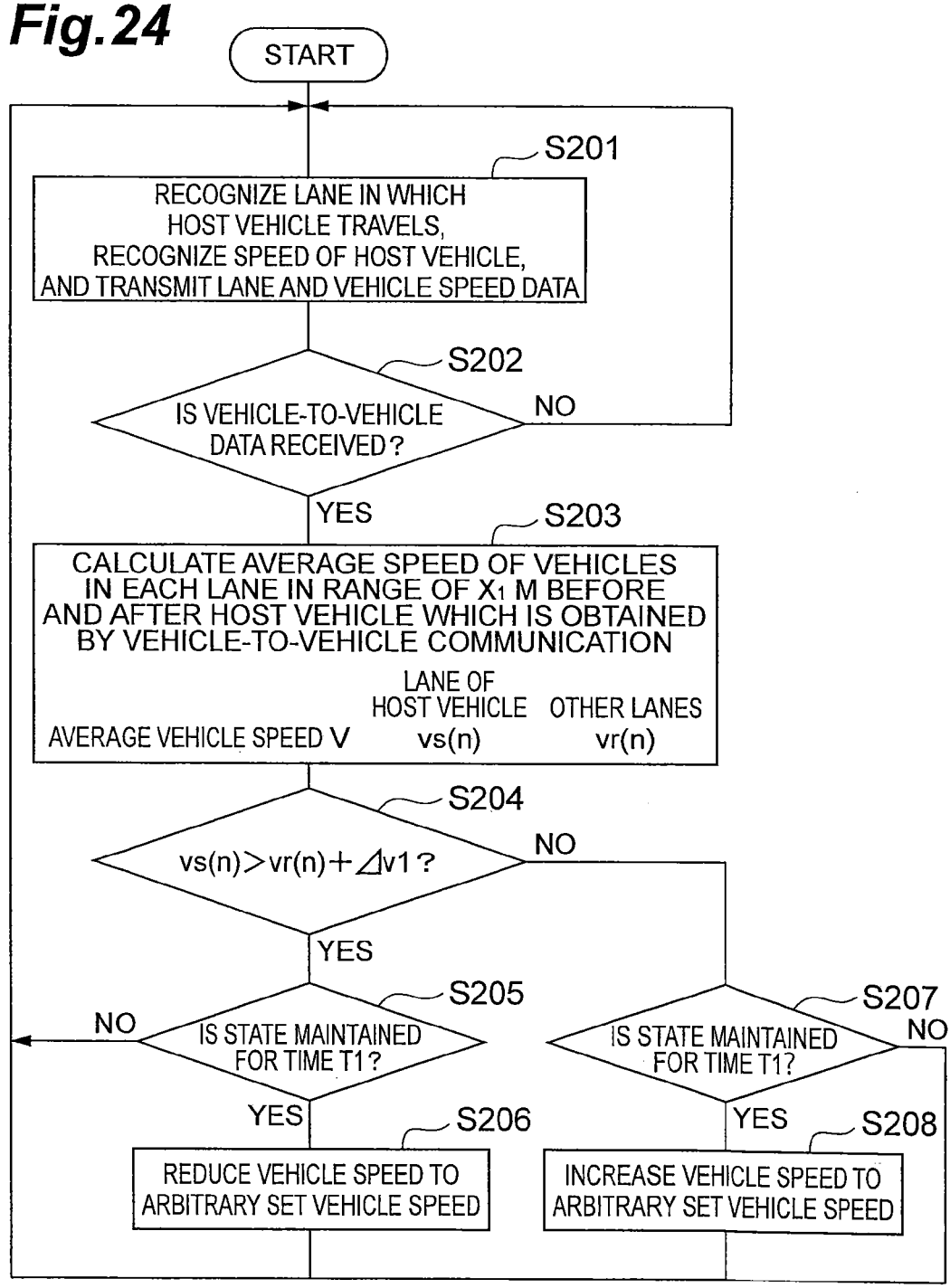
FIG. 24 is a flowchart illustrating the operation of a vehicle control device according to a fourth embodiment.
Figure 25:
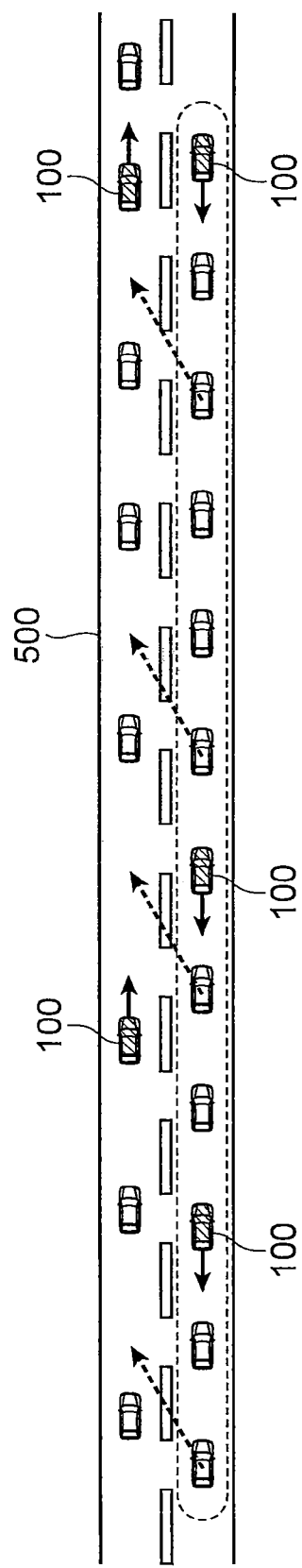
FIG. 25 is a plan view illustrating the operation of the vehicle control device according to the fourth embodiment.

In this case, as shown in FIG. 24, the system-provided vehicle 100 provided with the vehicle control device 10c recognizes the lane of the host vehicle using the traveling lane recognizing system 54 (S201). The system-provided vehicles 100 share the information related to the lane and the vehicle speed using the vehicle-to-vehicle communication system 52 (S202). In this case, the vehicle control device may acquire data for the position where traffic congestion occurs, such as a sag section, from, for example, a navigation system and start control at a position $X_2$ km ahead of the sag section, and cancel the control after the vehicle passes through the sag section.

The traffic flow improvement control system 61 of the calculating unit 60 calculates the average vehicle speed V=vs (n) of the lane of the host vehicle and the average vehicle speed V=vr(n) of other lanes in the range of $X_1$ m before and after the host vehicle on the basis of the information of each lane acquired by the vehicle-to-vehicle communication system 52 (S203). When vs(n)>vr(n)+ΔV1 is satisfied, that is, the average vehicle speed of the lane of the host vehicle is more than the sum of the average vehicle speed of other lanes and a predetermined threshold value ΔV1 (S204) and the state is maintained for a unit time T1 (S205), the traffic flow improvement control system 61 performs control to reduce the speed of the host vehicle to an arbitrary set vehicle speed (S206).

On the other hand, when vs(n)>vr(n)+ΔV1 is not satisfied, that is, the average vehicle speed of the lane of the host vehicle is not more than the sum of the average vehicle speed of other lanes and the predetermined threshold value ΔV1 (S204) and the state is maintained for the unit time T1 (S207), the traffic flow improvement control system 61 performs control to increase the speed of the host vehicle to an arbitrary set vehicle speed (S208).

As such, in this embodiment, speed control is performed when the conditions of Step S204 are maintained for the unit time T1. In this way, after the speed is changed, the vehicle speed is maintained for the time T1 and then the setting of the vehicle speed of each lane is changed. In this case, the average vehicle speed vr of other lanes are set such that the acceleration a1 at that time is sufficiently reduced. In addition, the set vehicle speed of each lane may be, for example, V3=|vs(n)−vr(n)|+Δv2.

The amount of traffic on the road is greatly affected by the concentration of the amount of traffic in each lane. According to this embodiment, the traffic flow improvement control system 61 of the calculating unit 60 controls at least one of the inter-vehicle distance and the vehicle speed on the basis of the amount of traffic in each lane of the road related to the information acquired by the input unit 50. Therefore, it is possible to effectively suppress traffic congestion according to the concentration of the amount of traffic in each lane.

The exemplary embodiments of the invention have been described above, but the invention is not limited to the above-described embodiments. Various modifications and changes of the invention can be made. For example, in the above-described embodiments, the vehicle control device provided in each system-provided vehicle performs vehicle control for preventing traffic congestion. However, for example, the vehicle control device may be provided only in the management center and transmit commands from the management center to each vehicle using communication, thereby performing the vehicle control for preventing traffic congestion.

INDUSTRIAL APPLICABILITY

According to the invention, it is possible to effectively suppress traffic congestion when the penetration rate of system-provided vehicles including the vehicle control device according to the invention is low.

REFERENCE SIGNS LIST 10a, 10b, 10c: VEHICLE CONTROL DEVICE
12: VEHICLE-TO-VEHICLE COMMUNICATION DEVICE

14: ROAD-TO-VEHICLE COMMUNICATION DEVICE
16: NAVIGATION SYSTEM
18: MM COMMUNICATION DEVICE
20: ECU
30: ACC
32: RADAR
50: INPUT UNIT
51: INFRASTRUCTURE INFORMATION RECEIVING SYSTEM
52: VEHICLE-TO-VEHICLE COMMUNICATION SYSTEM
53: VEHICLE-IN-FRONT SPEED DETECTING SYSTEM (FOR EXAMPLE, INTER-VEHICLE DISTANCE SENSOR)
54: TRAVELING LANE RECOGNIZING SYSTEM (FOR EXAMPLE, CAMERA)
60: CALCULATING UNIT
61: TRAFFIC FLOW IMPROVEMENT CONTROL SYSTEM
70: CONTROL UNIT
71: ENGINE CONTROL ECU
72: BRAKE CONTROL ECU
73: STEERING CONTROL ECU
100, 100a, 100b: SYSTEM-PROVIDED VEHICLE
200, 200p: GENERAL VEHICLE
500: ROAD
600: OPTICAL BEACON COMMUNICATION DEVICE

The invention claimed is:

1. A vehicle control device comprising:
a vehicle-to-vehicle communication unit that communicates with other vehicles;
a vehicle detecting unit that detects other vehicles; and
a traveling control unit that controls a traveling of a host vehicle based on an information acquired by the vehicle-to-vehicle communication unit and the vehicle detecting unit,
wherein,
when a system-provided vehicle which is the other vehicle including the vehicle control device, a general vehicle following the system-provided vehicle which is the other vehicle without including the vehicle control device, and the host vehicle following the general vehicle travel on a same lane of a road,
the traveling control unit of the host vehicle estimates a number N of the general vehicles between the system-provided vehicle and the host vehicle based on any one of a distance headway $L_C$ between the system-provided vehicle and the host vehicle acquired by the vehicle-to-vehicle communication unit, a speed $V_P$ of the system-provided vehicle acquired by the vehicle-to-vehicle communication unit, a distance headway $L_R$ between the host vehicle and a general vehicle which is immediately in front of the host vehicle acquired by the vehicle detecting unit, a predicted time headway $T_{pre}$ between the general vehicles and a time headway between the general vehicles which travel in an adjacent lane of the host vehicle detected by vehicle detecting unit,
wherein the traveling control unit of the host vehicle calculates a predicted distance headway $L_{RL}$ between the system-provided vehicle and the general vehicle which is immediately in front of the host vehicle according to the number N estimated, and
wherein the traveling control unit of the host vehicle controls the traveling of the host vehicle such that a distance headway between the system-provided vehicle and the general vehicle which is immediately in front of the host vehicle is less than the predicted distance headway $L_{RL}$.

2. The vehicle control device according to claim 1,
wherein the traveling control unit of the host vehicle calculates a target time headway $T_{RL}$ between the system-provided vehicle and the general vehicle which is immediately in front of the host vehicle based on the product of a target guide time headway $k_{TL}$ between the general vehicles and the number N, and
wherein the traveling control unit of the host vehicle calculates the predicted distance headway $L_{RL}$ based on the product of a target speed $V_{Rt}$ of the system-provided vehicle acquired by the vehicle-to-vehicle communication unit and the target guide time headway $k_{TL}$.

3. The vehicle control device according to claim 2,
wherein the traveling control unit of the host vehicle controls the traveling of the host vehicle such that the host vehicle travels in a section in which the predicted distance headway $L_{RL}$+a target distance headway $L_{Rt}$<the distance headway $L_C$<the predicted distance headway $L_{RL}$+the target distance headway $L_{Rt}$+a distance $L_{RC0}$ is satisfied on condition that the target distance headway $L_{Rt}$ is calculated by the product of the target speed $V_{Rt}$ and a target time headway $T_{Rt}$ between the host vehicle and the general vehicle which is immediately in front of the host vehicle.

4. A vehicle control method provided by a vehicle control device having a vehicle-to-vehicle communication circuitry that communicates with other vehicles, a vehicle detecting circuitry that detects other vehicles and a traveling control circuitry that controls a traveling of a host vehicle based on an information acquired by the vehicle-to-vehicle communication circuitry and the vehicle detecting circuitry, comprising:
when a system-provided vehicle which is the other vehicle including the vehicle control device, a general vehicle following the system-provided vehicle which is the other vehicle without including the vehicle control device, and the host vehicle following the general vehicle travel on a same lane of a road,
estimating using the travel control circuitry of the host vehicle a number N of the general vehicles between the system-provided vehicle and the host vehicle based on any one of a distance headway $L_C$ between the system-provided vehicle and the host vehicle acquired by the vehicle-to-vehicle communication circuitry, a speed $V_P$ of the system-provided vehicle acquired by the vehicle-to-vehicle communication circuitry, a distance headway $L_R$ between the host vehicle and a general vehicle which is immediately in front of the host vehicle acquired by the vehicle detecting circuitry, a predicted time headway $T_{pre}$ between the general vehicles and a time headway between the general vehicles which travel in an adjacent lane of the host vehicle detected by the vehicle detecting circuitry;
calculating a predicted distance headway $L_{RL}$ between the system-provided vehicle and the general vehicle which is immediately in front of the host vehicle according to the number N estimated by the traveling control circuitry of the host vehicle; and
controlling using the travel control circuitry of the host vehicle the traveling of the host vehicle such that a distance headway between the system-provided vehicle and the general vehicle which is immediately in front of the host vehicle is less than the predicted distance headway $L_{RL}$.

5. The vehicle control method according to claim 4,
wherein a target time headway $T_{RL}$ between the system-provided vehicle and the general vehicle which is immediately in front of the host vehicle is calculated using the travel control circuitry of the host vehicle based on the product of a target guide time headway $k_{TL}$ between the general vehicles and the number N, and wherein the predicted distance headway $L_{RL}$ is calculated using the travel control circuitry of the host vehicle based on the product of a target speed $V_{Rt}$ of the system-provided vehicle acquired by the vehicle-to-vehicle communication circuitry and the target guide time headway $k_{TL}$.

6. The vehicle control method according to claim 5,
wherein the traveling of the host vehicle is controlled by the traveling control circuitry of the host vehicle such that the host vehicle travels in a section in which the predicted distance headway $L_{RL}$+a target distance headway $L_{Rt}$<the distance headway Lc < the predicted distance headway $L_{RL}$+the target distance headway $L_{Rt}$+a distance $L_{RC0}$ is satisfied on condition that the target distance headway $L_{Rt}$ is calculated by the product of the target speed $V_{Rt}$ and a target time headway $T_{Rt}$ between the host vehicle and the general vehicle which is immediately in front of the host vehicle.

* * * * *